United States Patent
Youn et al.

(10) Patent No.: US 12,164,777 B2
(45) Date of Patent: Dec. 10, 2024

(54) CONTROLLING MEMORY STORAGE BASED ON PATTERN DATA

(71) Applicant: SAMSUNG ELECTRONICS CO., LTD., Suwon-si (KR)

(72) Inventors: SungJune Youn, Suwon-si (KR); Kyungmi Song, Suwon-si (KR); Hanjae Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 93 days.

(21) Appl. No.: 17/973,135

(22) Filed: Oct. 25, 2022

(65) Prior Publication Data

US 2023/0141682 A1  May 11, 2023

(30) Foreign Application Priority Data

Nov. 10, 2021 (KR) .................. 10-2021-0154272
May 16, 2022 (KR) .................. 10-2022-0059723

(51) Int. Cl.
*G06F 3/06* (2006.01)
(52) U.S. Cl.
CPC .......... *G06F 3/0616* (2013.01); *G06F 3/0659* (2013.01); *G06F 3/0679* (2013.01)
(58) Field of Classification Search
CPC .... G06F 3/0616; G06F 3/0659; G06F 3/0679; G06F 3/064; G06F 3/0688; G06F 3/061; G06F 3/0656; G06F 11/1044; G11C 29/42
See application file for complete search history.

(56) References Cited

U.S. PATENT DOCUMENTS

| | | | |
|---|---|---|---|
| 7,120,729 B2 | 10/2006 | Gonzalez et al. |
| 7,804,718 B2 | 9/2010 | Kim |
| 7,844,772 B2 | 11/2010 | Moon et al. |
| 8,171,207 B2 | 5/2012 | Chang et al. |
| 8,386,700 B2 | 2/2013 | Olbrich et al. |
| 8,874,835 B1 | 10/2014 | Davis et al. |
| 8,966,205 B1 | 2/2015 | Lo et al. |
| 9,195,588 B2 | 11/2015 | Cepulis |
| 9,430,376 B2 | 8/2016 | Horn |
| 9,594,673 B2 | 3/2017 | Kim et al. |
| 9,760,308 B2 | 9/2017 | Kang |

(Continued)

FOREIGN PATENT DOCUMENTS

EP  3367251 A1  8/2018
KR  10-1122511  3/2012

(Continued)

OTHER PUBLICATIONS

Korean Office Action Dated Nov. 21, 2022 Cited in KR Patent Application No. 10-2022-0059723.

(Continued)

*Primary Examiner* — Khoa D Doan
*Assistant Examiner* — Tong B. Vo
(74) *Attorney, Agent, or Firm* — Fish & Richardson P.C.

(57) ABSTRACT

A storage device includes a non-volatile memory and a memory controller. The memory controller selects a selection memory block to store data in response to pattern data corresponding to a logical address associated with a write request, and provides, to the non-volatile memory, a physical address of the selection memory block, as well as data and a write command associated with the write request.

20 Claims, 15 Drawing Sheets

(56) References Cited

U.S. PATENT DOCUMENTS

| | | |
|---|---|---|
| 9,829,952 B2 | 11/2017 | Park et al. |
| 9,846,542 B2 | 12/2017 | Seo et al. |
| 10,957,411 B2 | 3/2021 | Lee |
| 2008/0140918 A1 | 6/2008 | Sutardja |
| 2009/0113121 A1 | 4/2009 | Lee et al. |
| 2011/0029715 A1 | 2/2011 | Hu et al. |
| 2011/0238890 A1 | 9/2011 | Sukegawa |
| 2012/0297117 A1* | 11/2012 | Jo .................. G06F 12/0246 711/E12.008 |
| 2012/0297123 A1 | 11/2012 | Cherubini et al. |
| 2014/0013032 A1 | 1/2014 | Min et al. |
| 2014/0122774 A1 | 5/2014 | Xian et al. |
| 2015/0067286 A1 | 3/2015 | Colgrove et al. |
| 2016/0147277 A1 | 5/2016 | Park et al. |
| 2016/0306590 A1 | 10/2016 | Kang |
| 2017/0317693 A1 | 11/2017 | Yang et al. |
| 2018/0067850 A1 | 3/2018 | Kawamura et al. |
| 2018/0211708 A1* | 7/2018 | Igahara .................. G11C 16/105 |
| 2019/0074283 A1* | 3/2019 | Amaki .................. G11C 16/26 |
| 2020/0218653 A1 | 7/2020 | Ryu |
| 2020/0409559 A1* | 12/2020 | Sharon .................. G06F 3/064 |
| 2021/0216446 A1* | 7/2021 | Yang .................. G06F 11/076 |
| 2022/0035735 A1* | 2/2022 | Bhardwaj .......... G06F 12/0246 |
| 2024/0134552 A1* | 4/2024 | Hashimoto ............. G06F 3/061 |

FOREIGN PATENT DOCUMENTS

| | | |
|---|---|---|
| KR | 10-1174308 | 8/2012 |
| KR | 10-2014-0006299 | 1/2014 |
| KR | 10-1460826 | 11/2014 |
| KR | 10-2016-0061731 | 6/2016 |
| KR | 10-1686346 | 12/2016 |
| KR | 10-1894625 B1 | 9/2018 |
| KR | 10-1950759 | 2/2019 |
| KR | 1020200030244 A | 3/2020 |
| KR | 10-2085127 | 4/2020 |
| KR | 10-2113212 | 5/2020 |
| KR | 10-2291806 | 8/2021 |

OTHER PUBLICATIONS

Korean Notice of Allowance Dated Apr. 17, 2023 Cited in KR Patent Application No. 10-2022-0059723.

European Search Report Dated Mar. 21, 2023 Cited in EP Patent Application No. 22203196.5.

* cited by examiner

FIG. 2

| Logical block address | Physical block address | Valid | First counting information | Second counting information |
|---|---|---|---|---|
| LBA 0 | PBA 0 | 1 | 0b | 1b |
| LBA 1 | PBA 1 | 0 | 1b | 1b |
| LBA 2 | PBA 2 | 1 | 0b | 0b |
| LBA 3 | — | — | 1b | 1b |
| LBA 4 | PBA 4 | 1 | 1b | 0b |

200

_US 12,164,777 B2_

CONTROLLING MEMORY STORAGE BASED ON PATTERN DATA

CROSS-REFERENCE TO RELATED APPLICATIONS

This application claims priority under 35 U.S.C. § 119 to Korean Patent Application No. 10-2021-0154272 filed on Nov. 10, 2021 and Korean Patent Application No. 10-2022-0059723 filed on May 16, 2022, the collective subject matter of which is hereby incorporated by reference in its entirety.

BACKGROUND

The inventive concept relates generally to electronic devices, and more particularly, to memory controllers, storage devices, and operating methods of storage devices.

Recently, the demand for large-capacity, high-performance storage and memory devices has increased. For example, the generation and consumption of digital content such as high-definition video files places high performance demands on existing storage devices for enterprise and general users. Additionally, access times associated with storage devices performance have increasingly become bottlenecks.

Recently developed non-volatile storage devices have significantly improved access times. Such non-volatile storage devices include, for example, flash memory devices, phase-change random access memory (PRAM), spin-transfer torque random access memory (STT-RAM), and resistive random access memory (ReRAM).

However, certain solid state storage devices exhibit relatively limited write durability. Thus, as the utilization of storage devices increases due to the proliferation of large digital files such as high-definition videos, the likelihood of such recently developed storage devices rapidly reaching write durability limits is expected to increase more and more.

In order to extend the useful life of non-volatile memory storage devices, wear leveling is often used to evenly distribute write/program operations over substantially all available memory blocks.

SUMMARY

Embodiments of the inventive concept provide memory controllers, storage devices, and operating methods of storage devices enabling the selection of a memory block to store data according to pattern data.

According to an aspect of the inventive concept, there is provided a storage device including; a non-volatile memory including a plurality of memory blocks, and a memory controller. The memory controller is configured to receive a write request including a logical address from a host, receive data associated with the write request, select a selection memory block from among the plurality of memory blocks based on pattern data corresponding to the logical address, and provide the data, a write command associated with the write request, and a physical address corresponding to the selection memory block to the non-volatile memory, wherein the pattern data includes first counting information characterizing a first count related to a characteristic parameter value associated with the logical address falling within a first range, and second counting information characterizing a second count related to the characteristic parameter value falling within a second range different from the first range.

According to an aspect of the inventive concept, there is provided an operating method of a storage device. The operating method includes; receiving a logical address and data from a host, determining pattern data corresponding to the logical address, selecting a selection memory block from among a plurality of memory blocks based on the pattern data, and storing the data in the selection memory block, wherein the pattern data includes first counting information characterizing a first count related to a characteristic parameter value associated with the logical address falling within a first range, and second counting information characterizing a second count related to the characteristic parameter value falling within a second range different from the first range.

According to an aspect of the inventive concept, there is provided a memory controller including; a buffer memory configure to store pattern data corresponding to a logical address, at least one counter configured to count time from an initial time, and a flash translation layer configured to obtain an access time by controlling the at least one counter to count time from the initial time to a time at which the logical address is accessed, update the pattern data in response to the access time, and reinitialize the at least one counter to the initial time, wherein the pattern data includes first counting information characterizing a first count related to a characteristic parameter value associated with the logical address falling within a first range, and second counting information characterizing a second count related to the characteristic parameter value falling within a second range different from the first range.

According to an aspect of the inventive concept, there is provided a storage device including; a non-volatile memory including a plurality of memory blocks, and a memory controller configured to update pattern data stored in a buffer memory in response to an access time when a logical address is assessed in response to a read request, and provide a read command and a physical address corresponding to the logical address to the non-volatile memory, wherein the pattern data includes first counting information characterizing a first count related to a characteristic parameter value associated with the logical address falling within a first range, and second counting information characterizing a second count related to the characteristic parameter value falling within a second range different from the first range.

BRIEF DESCRIPTION OF THE DRAWINGS

Advantages, benefits and features, as well as the making and use of the inventive concept may be more clearly understood upon consideration of the following detailed description together with the accompanying drawings, in which:

FIG. 2 is a conceptual diagram illustrating a map table including exemplary map data and pattern data according to embodiments of the inventive concept;

DETAILED DESCRIPTION

Throughout the written description and drawings, like reference numbers and labels are used to denote like or similar elements, components, features and/or method steps.

Figure 1:
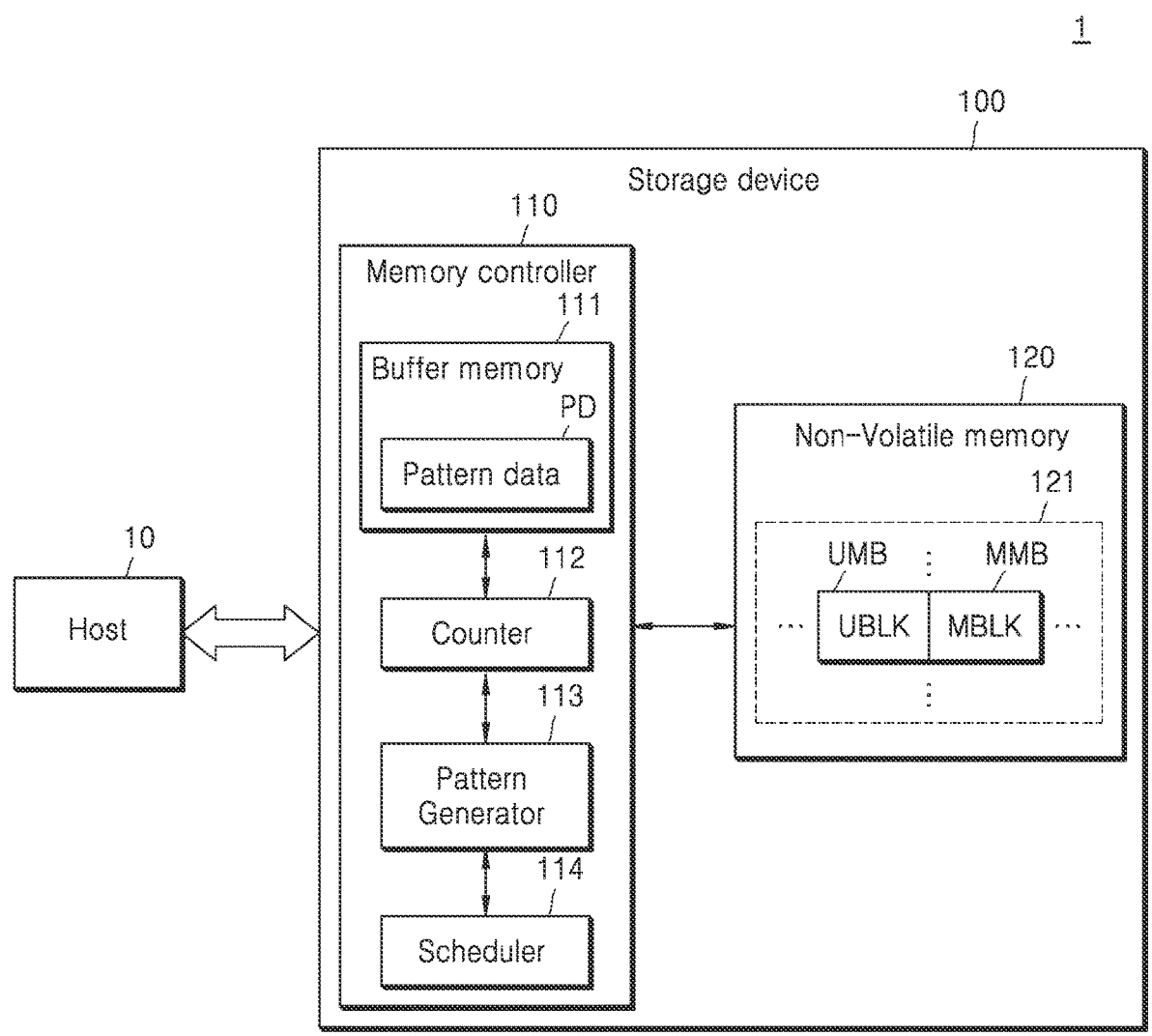
FIG. 1 is a block diagram illustrating in one example a storage system according to embodiments of the inventive concept.

Figure (FIG. 1 is a block diagram illustrating a storage system 1 according to embodiments of the inventive concept, wherein the storage system 1 generally includes a host 10 and a storage device 100.

Here, the host 10 may communicate (e.g., transmit and/or receive various signals) with the storage device 100 through an interface, such as an interface implemented in accordance with conventionally-understood technical standards or specification associated with, for example, the Non Volatile Memory express (NVMe), NVMe Management Interface (NVMe MI) and NVMe over Fabric (NVMe-oF).

In some embodiments, the host 10 may provide the storage device 100 with a write request related to (or defining) an operation storing (e.g., writing or programming) data in the storage device 100. Further, the host 10 may provide the storage device 100 with data to-be-stored in the storage device 100 and a logical address associated with the data. In some embodiments, the logical address may be included in the write request.

The storage device 100 may include various storage media configured to store the data in response to the write request received from the host 10. The storage device 100 may include at least one of, for example, a solid state drive (SSD), an embedded memory, and a removable external memory. In some embodiments wherein the storage device 100 is an SSD, the storage device 100 may be configured to operate in accordance with NVMe technical standards and specifications. In other embodiments wherein the storage device 100 is an embedded memory or an external memory, the storage device 100 may be configured in accordance with Universal Flash Storage (UFS) or embedded Multi-Media Card (eMMC) technical standards and specifications. In this regard, each of the host 10 and the storage device 100 may be configured to generate and communicate packet(s) in accordance with one or more conventionally-understood data communication protocol(s).

In the illustrated example of FIG. 1, the storage device 100 may generally include a memory controller 110 and a non-volatile memory 120, wherein the memory controller 110 may control overall operation of the storage device 100. The memory controller 110 may alternately be referred to as a controller, a device controller, or a storage controller.

Upon application of power from an external power source to the storage device 100, the memory controller 110 may execute firmware. In some embodiments wherein the non-volatile memory 120 is a flash memory device, the firmware may include a host interface layer (HIL), a flash translation layer (FTL), and a flash interface layer (FIL).

The memory controller 110 may control the non-volatile memory 120 during execution (or performing) of a write (or program) operation in response to the write request received from the host 10. In relation to the write or program operation, the memory controller 110 may provide a write or program command and a physical address, as well as the data to be written in the non-volatile memory 120. The memory controller 110 may also control the non-volatile memory 120 during execution of a read operation in response to the read request received from the host 10. In relation to the read operation, the memory controller 110 may provide a read command and a physical address to the non-volatile memory 120. The memory controller 110 may also control the non-volatile memory 120 during execution of an erase operation in response to the erase request received from the host 10. In relation to the erase operation, the memory controller 110 may provide an erase command and a physical address to the non-volatile memory 120.

Accordingly, the memory controller 110 may communicate an internally generated command, address, and/or data to the non-volatile memory 120 in response to a request received from the host 10. Additionally, the memory controller 110 may generate and communicate a command, an address, and data defining background operation executed by the non-volatile memory 120. In this regard, exemplary background operations include, for example, wear leveling, read reclaim, and garbage collection.

In some embodiments, the memory controller 110 may select a "selection memory block" (e.g., a memory block designated to store the data provided from the host 10) from among a number of memory blocks 121 included in the non-volatile memory 120 in response to (or based on) pattern data corresponding to the logical address associated with the write request. Thereafter, the memory controller 110 may provide a physical address of the selection memory block, data, and a write command to the non-volatile memory 120. The physical address of the selection memory block, the data, and the write command may be communicated through an interface provided between the memory controller 110 and the non-volatile memory 120.

Here, the term "pattern data" is used to denote a particular pattern of data provided together with the logical address. An example of pattern data will be described hereafter with reference to FIG. 2.

The memory controller 110 may update previously stored pattern data in accordance with an access time when a logical address associated with a read request is accessed. Also, the memory controller 110 may provide a physical address corresponding to the logical address and a read command to the non-volatile memory 120.

The memory controller 110 of FIG. 1 includes a buffer memory 111, a counter 112, a pattern generator 113, and a scheduler 114.

The buffer memory 111 may be used to store the pattern data PD, wherein the buffer memory 111 may be implemented as a volatile memory, such as a dynamic random access memory (RAM) (DRAM), a static random access memory (SRAM), etc. In some embodiments like the one illustrated in FIG. 1, the buffer memory 111 may be included within the memory controller 110, however in other embodiments, the buffer memory 111 may be external to the memory controller 110.

The buffer memory 111 may also be used to store map data. Here, map data may be understood as data providing information that indicates various mapping relationships between logical address(es) and physical address(es). Such information indicating mapping relationships between logical address(es) and physical address(es) may be referred to as "map information."

The counter 112 may be used to count time (e.g., perform a counting operation that generates a time period or time value) beginning from an initial time (for example, an initial time point). In some embodiments, the initial time may be 0 and the count time may be measured in seconds and/or portions of a second. For example, the counter 112 may count time in relation to a toggling clock signal having a defined and constant period, frequency, and duty ratio. In some embodiments, the counter 112 may include a plurality of counters, wherein the number of counters corresponds to a number of logical addresses. Hence, each of the plurality of counters may count time when a particular logical address is accessed (for example, an access time point). For example, an N-th counter may count an N-th time when an M-th logical address is accessed. Here, 'N' and 'M' are assumed to be positive integers.

The pattern generator 113 may be used to generate pattern data in accordance with a characteristic parameter value associated with a logical address. Here, the characteristic parameter value for the logical address may include, for example, a time when the logical address is accessed, a count by which the logical address is accessed, and/or a size (e.g., a chunk size) for data corresponding to the logical address. More particularly, for example, assuming that the characteristic parameter value for a logical address is a time at which the logical address is accessed, the pattern generator 113 may generate pattern data in relation to the time when the logical address is accessed. Here, a time at which the logical address is accessed may alternately be referred to as an "access time." For example, a time measured from an initial time to a time at which the logical address is accessed may be referred to as the access time.

The pattern generator 113 may be used to update the pattern data. For example, the pattern generator 113 may obtain an access time (e.g., time counted by the counter 112 from an initial time to the time at which the logical addressed is accessed), and update the pattern data in accordance with the access time.

The pattern generator 113 may also be used to initialize the counter 112 to the initial time. And in some embodiments, the initialized counter 112 may begin make one or more count(s) from the initial time.

During a write operation, the scheduler 114 may provide a physical address, data, and a write command. Alternately, during a read operation, the scheduler 114 may provide a physical address and a read command.

In some embodiments, the pattern generator 113 and scheduler 114 may be implemented as parts of a FTL.

The non-volatile memory 120 may operate under the control by the memory controller 110. More particularly, the non-volatile memory 120 may receive a command and an address from the memory controller 110 and access memory cell(s) selected by the address from among a plurality of memory cells provided by the non-volatile memory 120. That is, an indicated data access operation may performed in accordance with a command in relation to one or more memory cell(s) selected by the address.

In some embodiments, the non-volatile memory 120 may be a flash memory (e.g., a NAND type flash memory or a NOR type flash memory). In this regard, the non-volatile memory 120 may include a two-dimensional (2D) NAND flash memory array or a 3D (or vertical) NAND (VNAND) memory array. Alternately or additionally, the non-volatile memory 120 may include other types of non-volatile memories, such as magnetic RAM (MRAM), spin-transfer torque MRAM, conductive bridging RAM (CBRAM), ferroelectric RAM (FeRAM), phase-change RAM (PRAM), etc.

However constituted using one or more types of non-volatile memory devices, the non-volatile memory 120 provides a plurality of memory blocks 121. The plurality of memory blocks 121 may include at least one "user memory block" UMB (UBLK) and at least one "meta memory block" MMB (MBLK). Here, the user memory block UMB is a memory block designated to store user data received from the host 10, and the meta memory block MMB is a memory block designated to store meta data associated with the user data.

During a write operation, the user memory block UMB may be used as the selection memory block.

In some embodiments, the meta data may include map information, invalid data information, erase count information, and/or the like. However, the inventive concept is not limited thereto. As noted above, map information is information indicating mapping relationships between logical address(es) and physical address(es). Additionally, invalid data information is information indicating whether particular data stored in a memory block is valid or invalid, and erase count information is information indicating a number of erase counts of a memory block.

FIG. 2 is a conceptual diagram illustrating a map table 200 including exemplary map data and pattern data according to embodiments of the inventive concept.

Referring to FIGS. 1 and 2, the buffer memory 111 may be used to store the map table 200, wherein the map table 200 may variously include map data, pattern data, validity determination data, etc.

In this regard, the map data may include map information. For example, logical address 0 (LBA 0) may be mapped to physical address 0 (PBA 0), logical address 1 (LBA 1) may be mapped to physical address 1 (PBA 1), logical address 2 (LBA 2) may be mapped to physical address 2 (PBA 2), and logical address 4 (LBA 4) may be mapped to physical address 4 (PBA 4), wherein logical address 3 (LBA 3) is not mapped to a physical address.

The validity determination data may include validity determination data information. In some embodiments, the validity determination data information may be indicated using single bit value(s). Thus, for example, a bit value of 1 may indicate that data is valid, and a bit value of 0 may indicate that data is invalid.

The pattern data may include first counting information to K-th counting information, wherein 'K' is an integer greater than 1. Referring to FIG. 2 as one simple and illustrative example, the pattern data may include first counting information and second counting information (i.e., K=2). However, those skilled in the art will appreciate that as the number of counting information increases, so too will pattern data types increase.

The counting information may be information indicating a count by which a characteristic parameter value associated with a logical address is deemed to fall within a particular range. Referring to FIG. 2, for example, the first counting information may be information about (or characterizing) a first count, and the second counting information may be information about (or characterizing) a second count. In this case, the first count may be a count by which (or related to) the characteristic parameter value falls (falling) within a first range, and the second count may be another count by which (or related to) the characteristic parameter value falls (falling) within a second range, different from the first range.

In some embodiments, when the characteristic parameter is expressed as an access time, the first count of the first counting information may be a count by which the access time is deemed to fall within the first range, and the second count of the second counting information may be a count by which the access time is deemed to fall within the second range. Here, the access time may correspond to a time period extending from an initial point in time (e.g., an initial time) to a point in time at which the logical address is accessed (e.g., an access time point).

In some embodiments, a maximum value for the first range may be less than or equal to a minimum value for the second range. For example, the maximum value of the first range may be equal to the minimum value of the second range.

In some embodiments, the pattern generator 113 may update the pattern data by determining (or identifying) whether the characteristic parameter value falls within one of the first range and the second range whenever the logical address is accessed. Accordingly, the first count may be stored as a bit value in the map table 200. For example, assuming that the first count is 10, it may be stored as 1010b in the map table 200. The second count may also be stored as a bit value in the map table 200. Here, it may be necessary to secure a bit position for storing the first count and the second count itself as a bit value. That is, the bit position for storing the first count and the second count itself as a bit value may be finite. Thus, it may be possible to reduce the storage space.

In some embodiments, the first counting information may include a first bit value corresponding to a first count range or a second bit value corresponding to a second count range. Also, a maximum value of the first count range may be less than a minimum value of the second count range. For example, the first count range may be 0 to 1000, and the second count may be greater than or equal to 1001. For example, the first bit value may be 0b, and the second bit value may be 1b. Thus, when current logical address 0 (LBA 0) is accessed and the access time of logical address 0 (LBA 0) falls within the first range, the first count may be increased. In this case, when the increased first count falls within the first count range, the pattern generator 113 may update the pattern data, such that the first counting information includes the first bit value. Alternately, when the increased first count falls within the second count range, the pattern generator 113 may update the pattern data, such that the first counting information includes the second bit value. Thus, assuming that the first count of logical address 0 (LBA 0) is 500, and given the first count range is 0 to 1000, and the first bit value is 0b, the first counting information corresponding to logical address 0 (LBA 0) may include 0b. Alternately, assuming that the first count of logical address 1 (LBA 1) is 1002, and given the second count range is greater than or equal to 1001, and the second bit value is 1b, the first counting information corresponding to logical address 1 (LBA 1) may include 1b. In relation to the foregoing illustrative example, when the bit value in the first counting information is changed from 0b to 1b, then it may be determined that access to the logical address occurs within a relatively short period of time, or with relatively high frequency. As a result, the data associated with the logical address may be deemed to be "hot data."

Moreover, analogous to the first counting information, the second counting information may include a first bit value corresponding to a first count range or a second bit value corresponding to a second count range. A maximum value of the first count range may be less than a minimum value of the second count range. When the increased second count falls within the first count range, the pattern generator 113 may update the pattern data, such that the second counting information may include the first bit value. Alternately, when the increased second count falls within the second count range, the pattern generator 113 may update the pattern data, such that the second counting information may include the second bit value. Here, for example, it is assumed that the access time of logical address 0 (LBA 0) falls within the second range. In this case, when the second count of logical address 0 (LBA 0) is 1500, and given the second count range is greater than or equal to 1001, and the second bit value is 1b, the second counting information corresponding to logical address 0 (LBA 0) may include 1b. Consistent with the foregoing example, when the bit value in the second counting information is changed from 0b to 1b, access to the logical address occurs within a relatively long period of time or with relatively low frequency. And as a result, the data associated with the logical address may be deemed to be "cold data."

The pattern of data stored in a user memory block (e.g., a first user memory block) having physical address 0 (PBA 0) may be {0b, 1b}, the pattern of data stored in a user memory block (e.g., a second user memory block) having physical address 1 (PBA 1) may be {1b, 1b}, the pattern of data stored in a user memory block (e.g., a third user memory block) having physical address 2 (PBA 2) may be {0b, 0b}, and the pattern of data stored in a user memory block (e.g., a fourth user memory block) having physical address 4 (PBA 4) may be {1b, 0b}. Here, among the patterns {0b, 0b}, {0b, 1b}, {1b, 0b}, and {1b, 1b}, the data of the pattern {1b, 1b} may be data deemed most frequently erased or programmed, and the data of the pattern {0b, 0b} may be data deemed least frequently erased or programmed. That is, the erase count of the second user memory block may be least, and the erase count of the third user memory block may be most. And as described above, hot data deemed more likely to be erased or programmed may be stored in a memory block having a lower erase count. In this manner, the wear-out degree between variously memory blocks may be more uniformly distributed, thereby extending the useful life of memory blocks as a group and a storage device including same.

It follows for example, that when a number of types of counting information is 'K' and each counting information includes 'i' bits, the number of cases of pattern data may be calculated as $2^{K*i}$. For example, when the first counting information and the second counting information each include 1 bit, the pattern data may be {0b, 0b}, {0b, 1b}, {1b, 0b}, or {1b, 1b} and the number of cases of pattern data may be $2^{2*1}$ or 4.

Further with respect to the illustrated example of FIG. 2, each of the first counting information and the second counting information may be represented as a single bit, however, the inventive concept is not limited thereto. Thus, assuming that the first counting information and the second counting information are each represented by two or more bits, the number of count ranges may increase, and the number of types of pattern data may also increase. Nonetheless, by storing pattern data using a lesser number of bit values, storage capacity required for the pattern data may be reduced.

Figure 3:
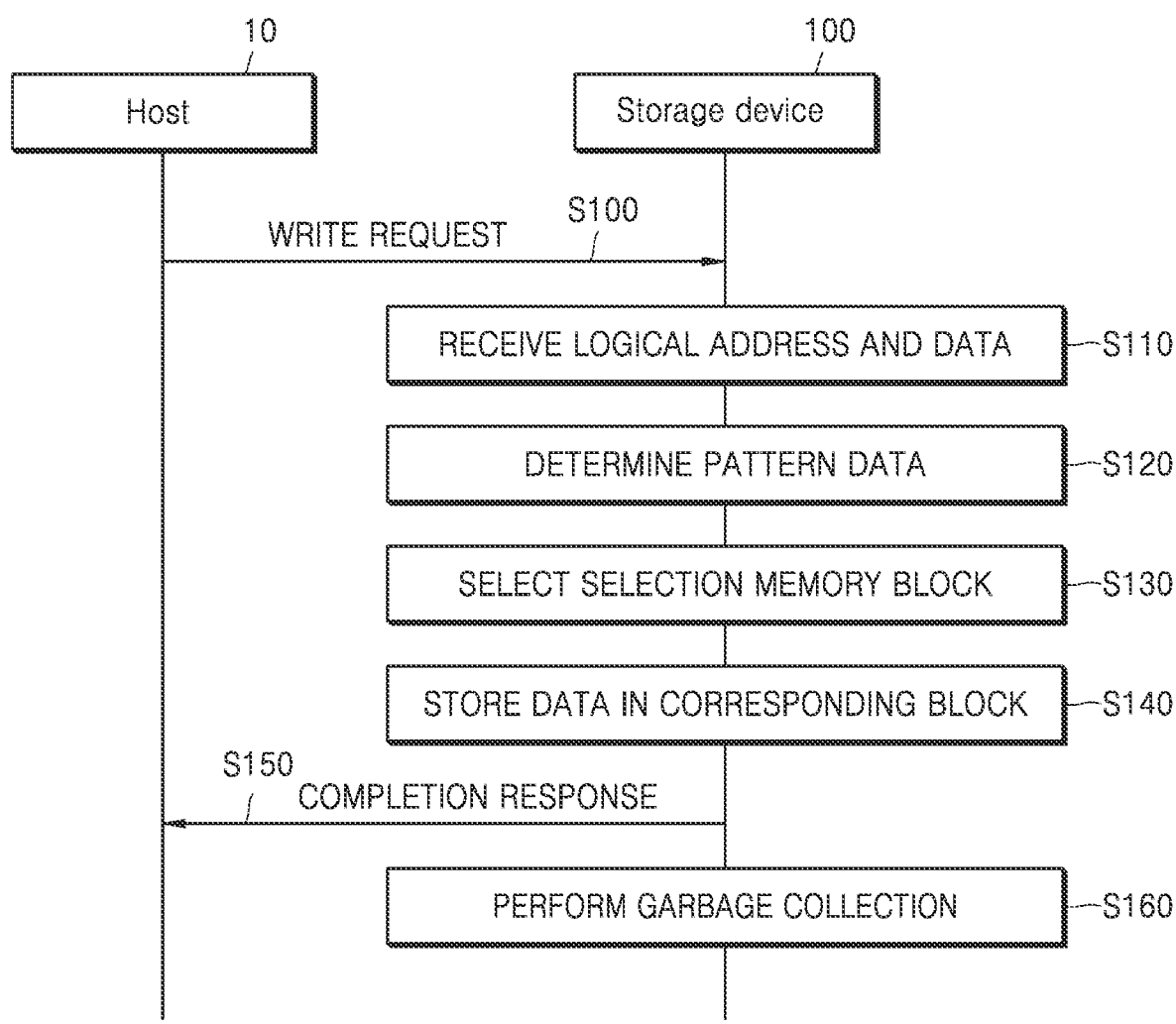
FIG. 3 is a flow diagram illustrating in one example an operating method for a memory system according to embodiments of the inventive concept.

FIG. 3 is a flow diagram illustrating in one example an operating method for storing data according to embodiments of the inventive concept.

Referring to FIGS. 1 and 3, the host 10 may communicate a write request to the storage device 100 (S100). Here, the write request may include a logical address, and the host 10 may also communicate data corresponding to the write request to the storage device 100.

Accordingly, the storage device 100 may receive the logical address and the data (S110) and identify pattern data corresponding to the logical address (S120). Thereafter, the storage device 100 may select a selection memory block (e.g., user memory block UMB) from among a plurality of memory blocks in accordance with the pattern data (S130), and store the data in the selection memory block (S140).

Upon completion of the write operation, the storage device 100 may communicate a completion response to the host 10 (S150), and perform, as needed, a garbage collection (S160). Those skilled in the art will understand that the term "garbage collection" is used to denote one of a number of possible background operations performed by the storage device 100 that creates additional free memory blocks from among the plurality of memory blocks.

Figure 4:
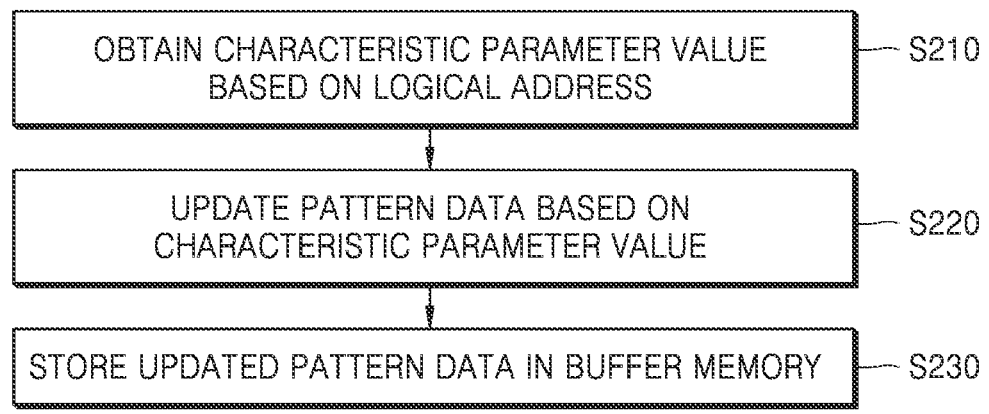
FIG. 4 is a flowchart illustrating in one example a method of determining pattern data according to embodiments of the inventive concept.

FIG. 4 is a flowchart further illustrating in one example the step of determining the pattern data (S120) in the method of FIG. 3.

Referring to FIGS. 1, 3 and 4, the memory controller 110 may obtain (e.g., generate) a characteristic parameter value in accordance with the received logical address (S210). For example, the pattern generator 113 may be used to obtain an access time corresponding to a time at which the logical address is accessed. Thereafter, the memory controller 110 may update the pattern data in relation to the characteristic parameter value (S220). In some embodiments, the pattern generator 113 may be used to update the pattern data in accordance with the characteristic parameter value whenever the logical address is accessed. The memory controller 110 may then store the updated pattern data (S230). For example, the pattern generator 113 may store the updated pattern data in the buffer memory 111.

Figure 5:
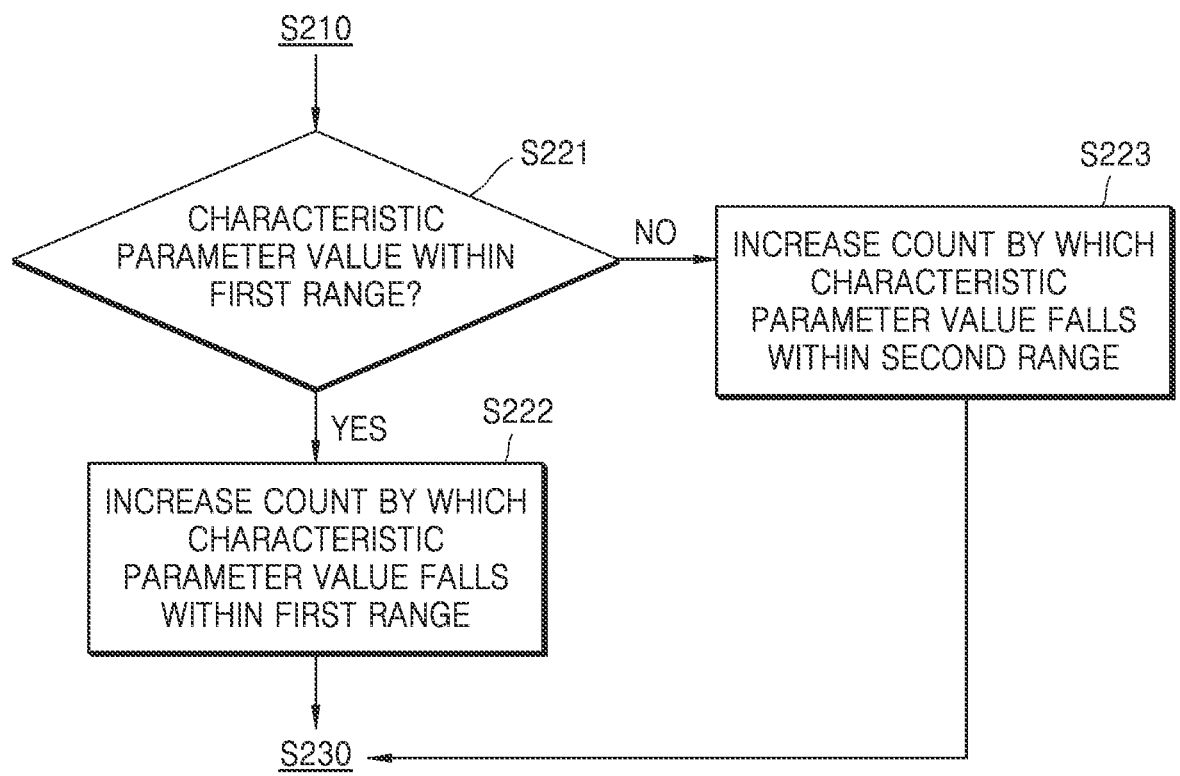
FIG. 5 is a flowchart further illustrating in one example the step (S220) of updating pattern data in the method of FIG. 4.

FIG. 5 is a flowchart further illustrating in one example the step of updating the pattern data (S220) in the method of FIG. 4.

Referring to FIGS. 1, 3, 4 and 5, the memory controller 110 may determine whether the characteristic parameter value falls within the first range (S221). Alternately or additionally, the memory controller 110 may determine whether the characteristic parameter value falls within a second range and/or another defined range. In some embodiments, the characteristic parameter value may indicate a size (e.g., a chunk size) of the data received from the host 10.

If the characteristic parameter value falls within the first range (S221=YES), the memory controller 110 may increase a count (e.g., the first count) associated with the characteristic parameter value falling within the first range (S222), else if the characteristic parameter value does not fall within the first range (S221=NO), the memory controller 110 may increase a count (e.g., the second count) associated with the characteristic parameter value falling within the second range (or another defined range).

Thus, consistent with the working example of FIG. 2, the method of FIG. 5 assumes that the pattern data includes the first counting information and the second counting information. However, as noted above, the pattern data may include first counting information to the K-th counting information, and therefore, the memory controller 110 may increase appropriate count associated with the characteristic parameter value falling within one of the first counting information range to the K-th counting information range.

Figure 6:
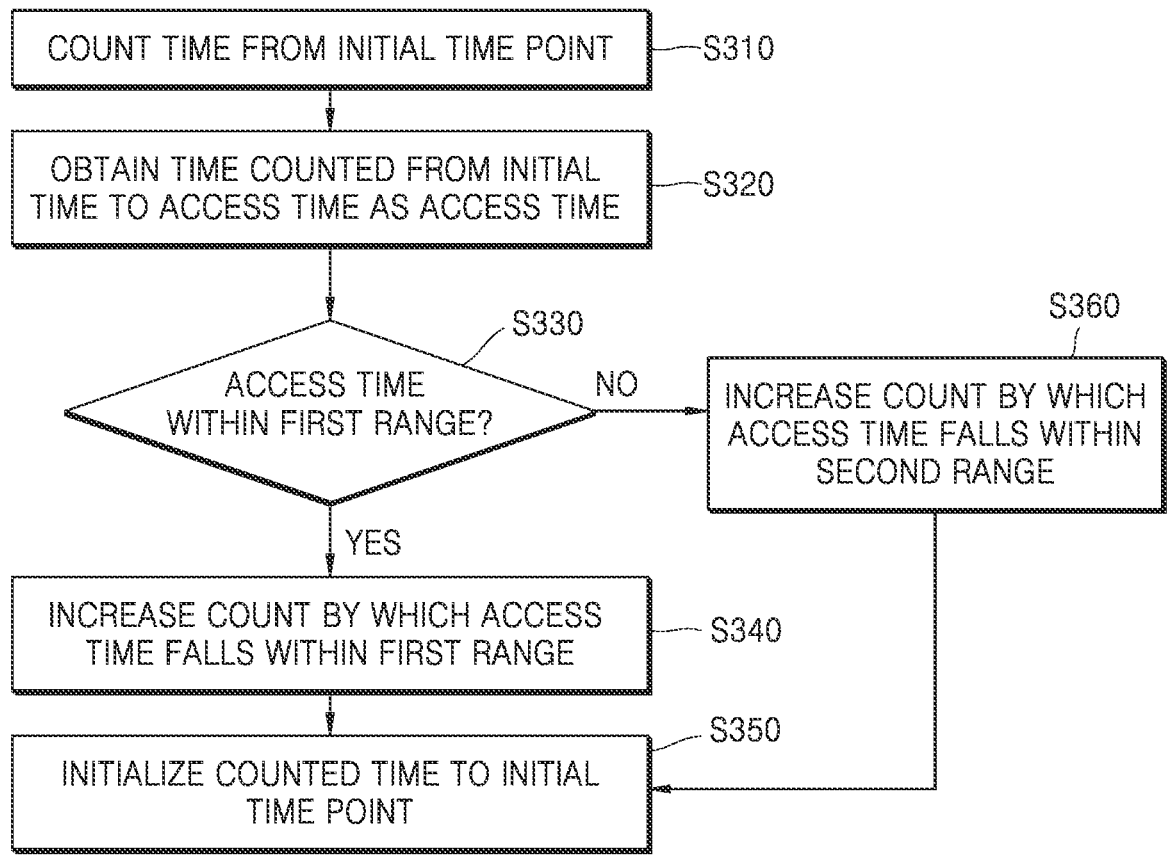
FIG. 6 is a flowchart illustrating in another example the step (S220) of updating pattern data in the method of FIG. 4.

FIG. 6 is a flowchart further illustrating in another example the step of updating the pattern data (S220) in the method of FIG. 4. Here, it is assumed that the characteristic parameter value corresponds to an access time, wherein the access time is a time period measured (or counted) from an initial time to an access time point at which the logical address is accessed.

Referring to FIGS. 1, 2, 3, 4 and 6, the counter 112 may begin counting from the initial time (S310). In some embodiments, the memory controller 110 may include a plurality of counters, wherein each of the plurality of counters counts a time from the initial time.

In this manner, the pattern generator 113 may obtain, as an access time, a time counted from the initial time to the access time (S320). For example, when each of logical address 0 (LBA 0) and logical address 1 (LBA 1) is accessed, the pattern generator 113 may obtain the access time from a first counter counting a time when logical address 0 (LBA 0) is accessed and a second counter counting a time when logical address 1 (LBA 1) is accessed.

The pattern generator 113 may determine whether the access time falls within the first range (S330). Alternately or additionally, the memory controller 110 may determine whether the access time falls within the second range and/or another defined range.

Upon determining that the access time falls within the first range (S330=YES), the pattern generator 113 may increase the count (e.g., the first count) associated with the access time falling within the first range (S340), and initialize the first counter (or second counter, etc.) to the initial time (S350). Else, upon determining that the access time does not fall within the first range (S330=NO—and within the characteristic parameter value falls within the second range), the memory controller 110 may increase the count (e.g., the second count) associated with the characteristic parameter value falling within the second range (S360).

Figure 7:
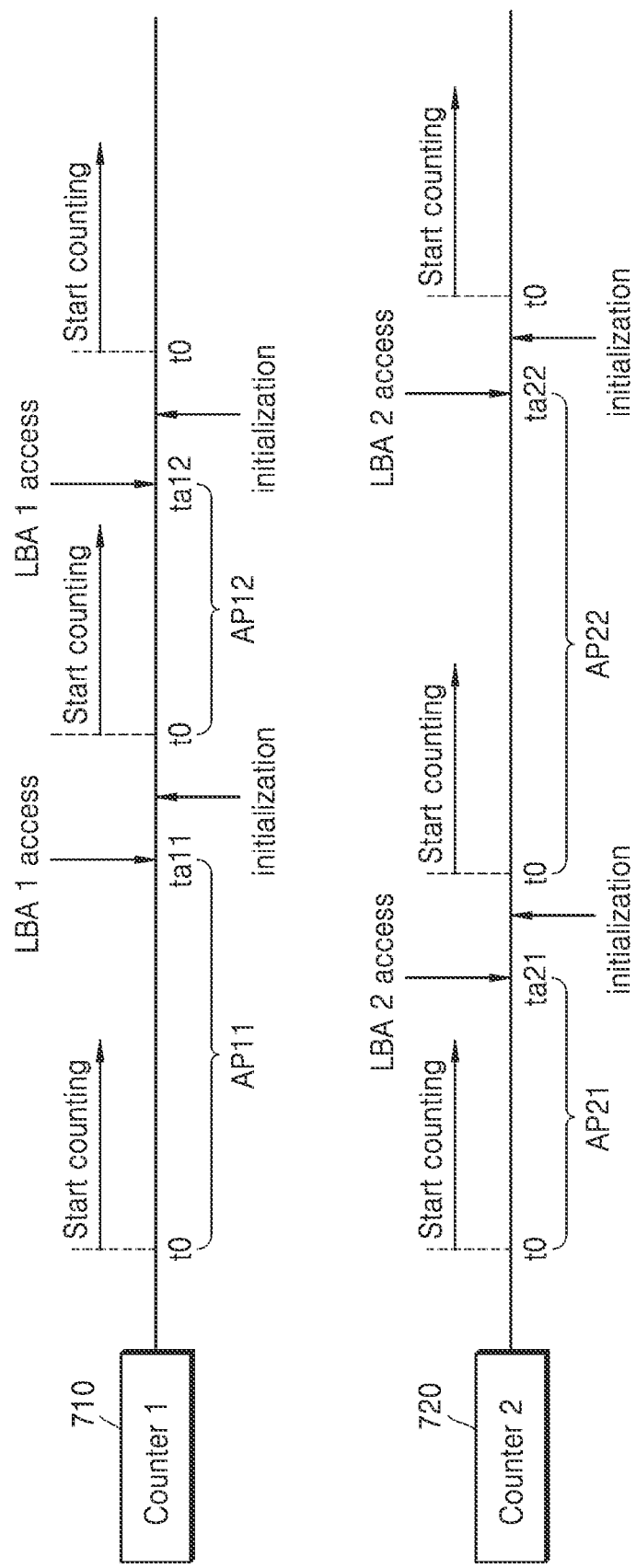
FIG. 7 is a conceptual diagram further illustrating the counting of access times associated with logical addresses according to embodiments of the inventive concept.

FIG. 7 is a conceptual diagram further illustrating the step of counting an access time in relation to the accessing of a logical address according to embodiments of the inventive concept.

Referring to FIGS. 1, 2, and 7, the memory controller 110 is assumed to include a plurality of counters (e.g., a first counter 710 and a second counter 720), wherein the first counter 710 counts a time when a first logical address is accessed and the second counter 720 counts a time when a second logical address, different from the first logical address, is accessed. It is further assumed that the first logical address is logical address 1 (LBA 1) and the second logical address is logical address 2 (LBA 2).

Accordingly, both the first counter 710 and the second counter 720 start counting at time t0. Here, the time to may be the initial time (e.g., 0).

It is further assumed that logical address 1 (LBA 1) is accessed at a time ta11. Hence, the time ta11 is a first access time AP11 associated with the logical address 1 (LBA 1). That is, a time period counted between time to and time ta11 is the first access time AP11 associated with the logical address 1 (LBA 1). In this manner, the pattern generator 113 may obtain the first access time AP11.

Accordingly, consistent with the method of FIG. 6, the pattern generator 113 may update pattern data corresponding to logical address 1 (LBA 1) in relation to the first access time AP11. Thereafter, the pattern generator 113 may reinitialize the first counter 710 to t0.

Thereafter, the logical address 1 (LBA 1) may again be accessed at time ta12. Thus, a time period between time to and time ta12, following time ta11, may be a second access time AP12 associated with the logical address 1 (LBA 1). Thus, again in this manner, the pattern generator 113 may obtain the second access time AP12 using the first counter 710. And consistent with the method of FIG. 6, the pattern generator 113 may update the pattern data corresponding to logical address 1 (LBA 1) in relation to the second access time AP12 and reinitialize the first counter 710 to the initial time to.

Moreover, it is assumed that the logical address 2 (LBA 2) is accessed at time ta21, and therefore, the pattern generator 113 obtains a first access time AP21 from the second counter 720 associated with the logical address 2 (LBA 2). Consistent with the method of FIG. 6, the pattern generator 113 may then update the pattern data corresponding to logical address 2 (LBA 2) in relation to the first access time AP21 and reinitialize the second counter 720 to the initial time to. Thereafter, the logical address 2 (LBA 2) is again accessed at time ta22 and the pattern generator 113 obtains a second access time AP21 from the second counter 720 associated with the logical address 2 (LBA 2). Thereafter, the pattern generator 113 may update the pattern data corresponding to logical address 2 (LBA 2) in relation to the second access time AP21, and reinitialize the second counter 720.

Figure 8:
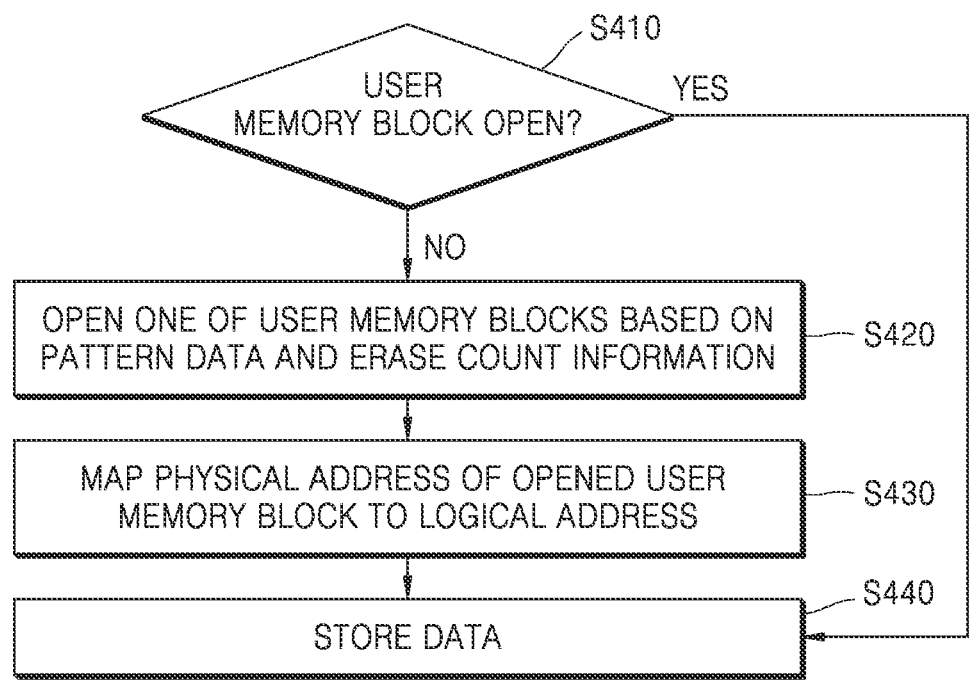
FIG. 8 is a flowchart illustrating in one example a method of storing data in a memory block according to embodiments of the inventive concept.

FIG. 8 is a flowchart illustrating in one example a method of storing data in a memory block according to embodiments of the inventive concept.

Referring to FIG. 8, the non-volatile memory 120 may include user memory blocks and meta memory blocks, wherein the meta data includes erase count information stored in relation to one or more of the memory blocks.

Initially, the memory controller 110 may determine whether a user memory block (e.g., a first user block) selected as the selection memory block is open (or enabled) (S410). If the user memory block is not open (S410=NO), the memory controller 110 may open any one of the user memory blocks in accordance with pattern data and erase count information (S420). For example, referring to FIG. 2, it is assumed that logical address 3 (LBA 3) is accessed, a maximum value for the first count range is less than a minimum value for the second count range, the first bit value is 0b, and the second bit value is 1b.

Under these illustrative assumptions, because the physical address corresponding to logical address 3 (LBA 3) is not currently mapped, the user memory block having the physical address corresponding to logical address 3 (LBA 3) is closed (or disabled). Further, because the pattern of the pattern data corresponding to logical address 3 (LBA 3) is {1b, 1b}, the memory controller 110 may open the user memory block having the same erase count as the second user memory block. When the pattern of the pattern data corresponding to logical address 3 (LBA 3) is {1b, 0b}, the memory controller 110 may open the user memory block having the same erase count as the fourth user memory block. That is, the memory controller 110 may open a user memory block having a first erase count with respect to first pattern data or open a user memory block having a second erase count with respect to second pattern data.

Thereafter, the memory controller 110 may map the physical address of the newly opened user memory block to the logical address (S430). Referring to FIG. 2, for example, the memory controller 110 may map the physical address of the opened user memory block to logical address 3 (LBA 3). As such, the memory controller 110 may select the opened user memory block as the selection memory block by mapping the physical address of the opened user memory block to the logical address.

Thereafter, the memory controller 110 may store data (S440). That is, the memory controller 110 may provide the physical address mapped in method step S430, a write command, and data to the non-volatile memory 120.

Figure 9:
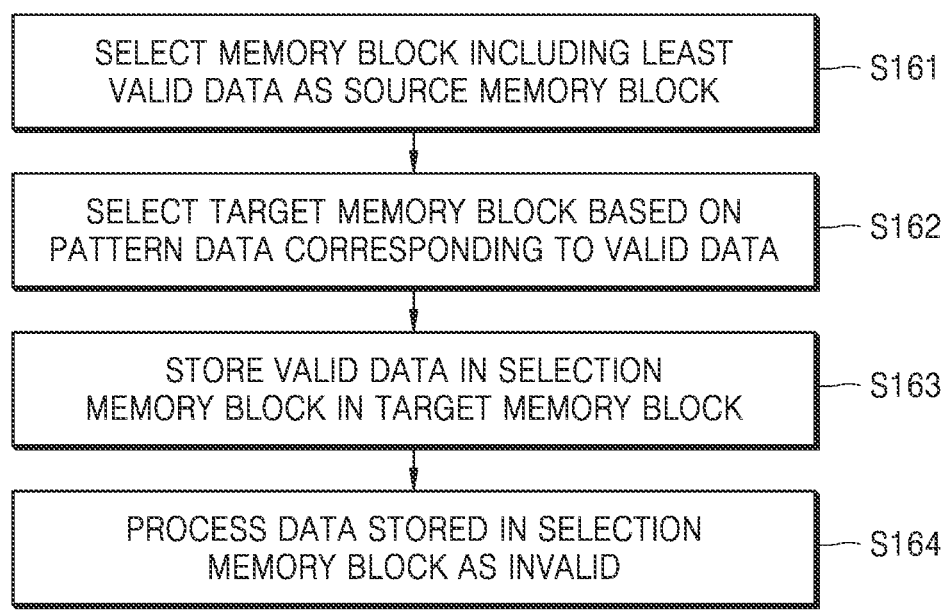
FIG. 9 is a flowchart illustrating in one example a method of performing garbage collection according to embodiments of the inventive concept.

FIG. 9 is a flowchart illustrating in one example a method of performing garbage collection according to embodiments of the inventive concept.

Referring to FIG. 9, assuming that a number of free memory blocks among a plurality of memory blocks is less than a reference number, a garbage collection operation may be initiated. For example upon performing starting the garbage collection operation, the memory controller 110 may select, as one or more source memory blocks, one or more memory block(s) having a least amount of valid data stored therein (S161).

Thereafter, the memory controller 110 may select one or more target memory block(s) in accordance with the pattern data associated with valid data stored in the source memory block(s) (S162). As many target memory block(s) may be selected as source memory block(s). For example, when one source memory block is selected, one target memory block may be selected. Here, the pattern data associated with valid data stored in the source memory block(s) may be the same, and the pattern data associated with valid data stored in the target memory block(s) may also be the same.

Valid data stored in the selection memory block may be copied (or transferred) to the target memory block (S163). That is, the memory controller 110 may control the non-volatile memory 120 to copy valid data stored in the selection memory block to at least one target memory block. Then, the memory controller 110 may invalidate data stored in the selection memory block (S164).

Figure 10:
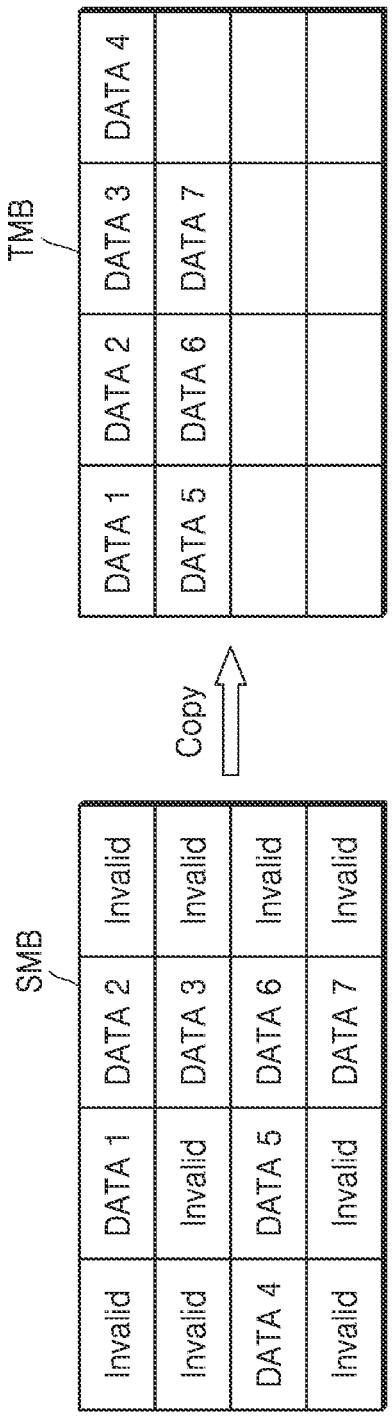
FIG. 10 is a conceptual diagram further illustrating garbage collection in relation to a source memory block and a target memory block according to embodiments of the inventive concept.

FIG. 10 is a conceptual diagram further illustrating the copying of valid data stored from a source memory block to a target memory block.

Referring to FIG. 10, a plurality of valid data (e.g., DATA 1, DATA 2, DATA 3, DATA 4, DATA 5, DATA 6, and DATA 7) and a plurality of invalid data (Invalid) may be stored in a source memory block SMB. Pattern data associated with the plurality of valid data may be equal to each other. Accordingly, the plurality of valid data may be copied from the source memory block SMB to the target memory block TMB, and the source memory block SMB may thereafter be erased (e.g., in units of memory blocks) in order to generate a new free memory block from the source memory block SMB.

Figure 11:
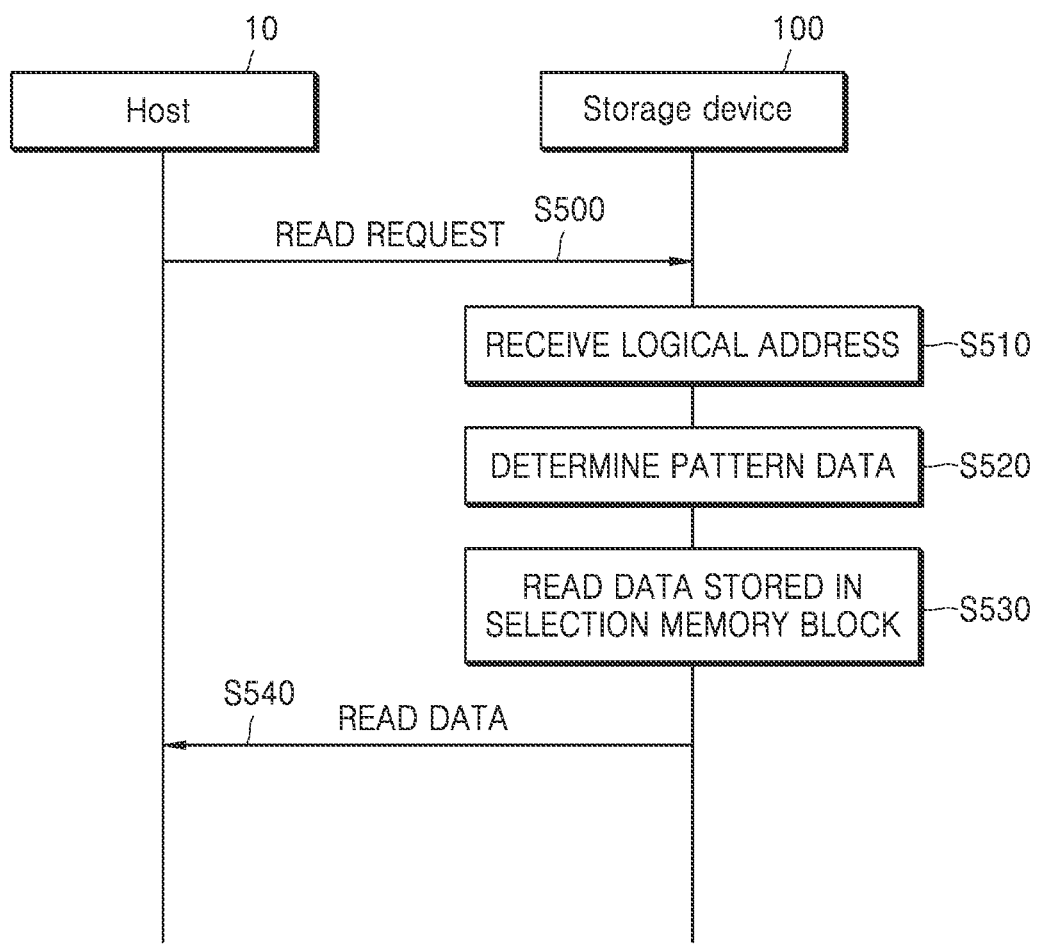
FIG. 11 is a flow diagram illustrating an operating method for a memory system reading data according to embodiments of the inventive concept.

FIG. 11 is a flow diagram illustrating in one example an operating method for a storage system reading data according to embodiments of the inventive concept. Of particular note with regard to the embodiment of FIG. 11, pattern data may be more accurately identified by updating the pattern data in relation to read operations.

Referring to FIGS. 1 and 11, the host 10 of the memory system 1 may provide a read request to the storage device 100 (S500).

In response to the read request, the storage device 100 may receive a logical address (S510) and identify pattern data corresponding to the logical address (S520). In some embodiments, the memory controller 110 included in the storage device 100 may update previously stored pattern data in accordance with an access time when the logical address of the read request is accessed. For example, the updating of pattern data in this regard may be performed in accordance with one of the embodiments described above in relation to FIGS. 4, 5 and 6.

Upon receiving the a logical address and determining the pattern data, the storage device 100 may read data stored in a selection memory block (S530). Here, the selection memory block may be a memory block having a physical address corresponding (or mapped) to the logical address. For example, in response to the logical address, the memory controller 110 may provide a read command as well as a physical address corresponding to the logical address to the non-volatile memory 120.

The storage device 100 may then communicate the read data to the host 10 (S540).

Figure 12:
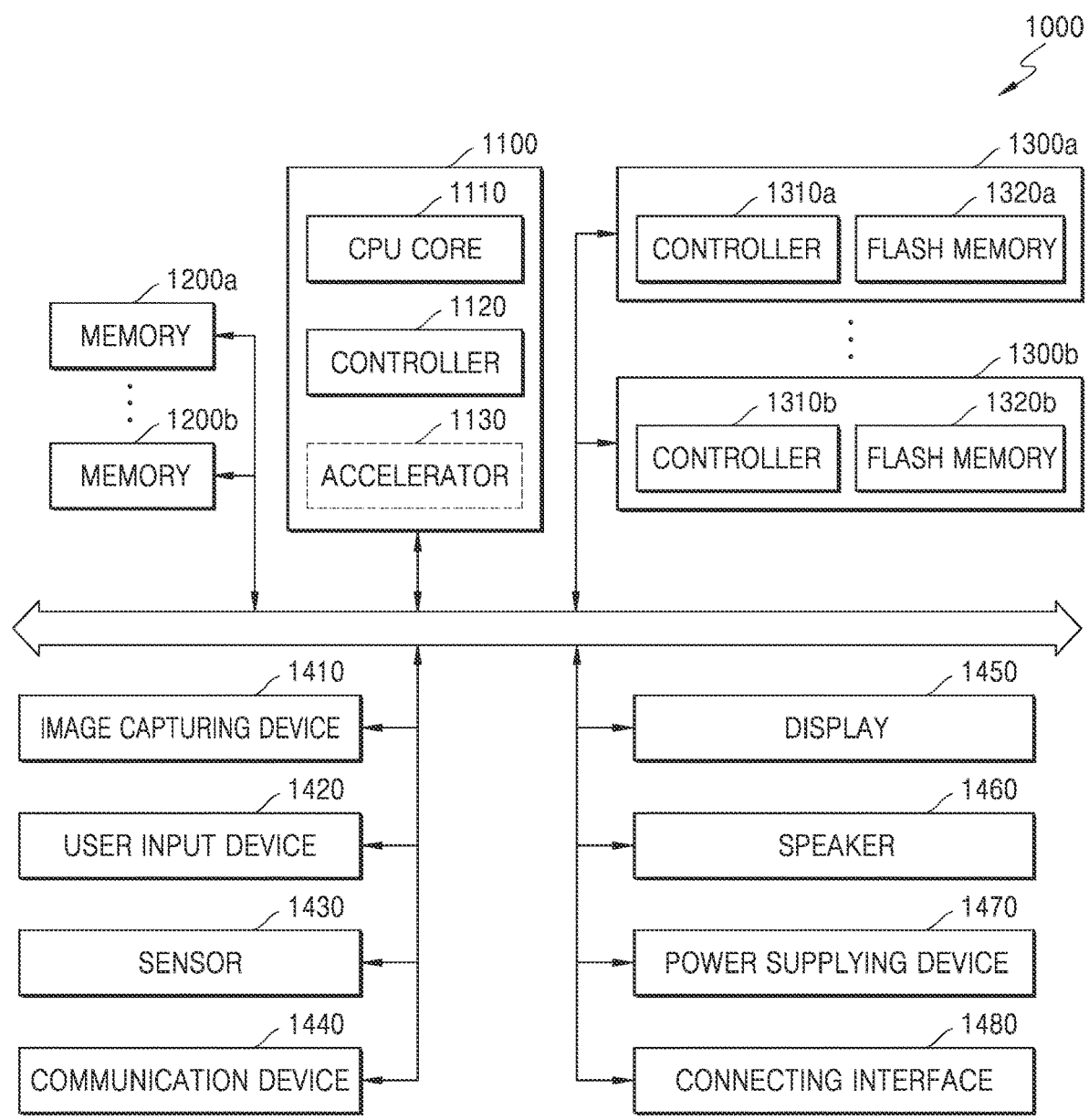
FIG. 12 is a block diagram illustrating an electronic system including a storage device according to embodiments of the inventive concept.

FIG. 12 is a block diagram illustrating an electronic system 1000 including a storage device according to embodiments of the inventive concept.

Referring to FIG. 12, the electronic system 1000 may be variously implemented as a mobile system, such as a portable communication terminal (mobile phone), a smart phone, a tablet personal computer (PC), a wearable device, a healthcare device, or an Internet of Things (IoT) device. However, the electronic system 1000 is not necessarily limited to mobile systems, but may alternately be implemented as a desktop PC, a laptop PC, a server, a media player, or an automotive device such as a navigation system.

The electronic system 1000 of FIG. 11 may include a main processor 1100, memories 1200a and 1200b, and storage devices 1300a and 1300b and may further include one or more of an image capturing device 1410, a user input device 1420, a sensor 1430, a communication device 1440, a display 1450, a speaker 1460, a power supply device 1470, and a connection interface 1480.

The main processor 1100 may control an overall operation of the electronic system 1000, and more particularly, an operation of other components constituting the electronic system 1000. The main processor 1100 may be implemented as, for example, a general-purpose processor, a dedicated processor, or an application processor.

The main processor 1100 may include one or more CPU cores 1110 and may further include a controller 1120 for controlling the memories 1200a and 1200b and/or the storage devices 1300a and 1300b. According to an embodiment, the main processor 1100 may further include an accelerator 1130 that is a dedicated circuit for high-speed data operation such as artificial intelligence (AI) data operation. The accelerator 1130 may include, for example, a graphics processing unit (GPU), a neural processing unit (NPU), and/or a data processing unit (DPU) and may be implemented as a separate chip that is physically independent from other components of the main processor 1100.

The memories 1200a and 1200b may be used as a main memory device of the electronic system 1000 and may include volatile memories such as SRAMs and/or DRAMs or may include non-volatile memories such as flash memories, PRAMs, and/or resistance RAMs (RRAMs). The memories 1200a and 1200b may also be implemented in the same package as the main processor 1100.

The storage devices 1300a and 1300b may function as a non-volatile storage device that stores data regardless of whether power is supplied thereto, and may have a larger storage capacity than the memories 1200a and 1200b. The storage devices 1300a and 1300b may include storage controllers 1310a and 1310b and non-volatile memories (NVMs) 1320a and 1320b that store data under the control by the storage controllers 1310a and 1310b. The non-volatile memories 1320a and 1320b may include a flash memory having a two-dimensional (2D) structure or a three-dimensional (3D) vertical NAND (V-NAND) structure or may include other types of non-volatile memories such as PRAMs and/or RRAMs.

The storage devices 1300a and 1300b may be included in the electronic system 1000 in a state physically separated from the main processor 1100. Alternately, the storage devices 1300a and 1300b may be implemented in the same package as the main processor 1100. Also, since the storage devices 1300a and 1300b may be variously implemented as a SSD or memory card, the storage devices 1300a and 1300b may be detachably connected to other components of the electronic system 1000 through an interface such as the connection interface 1480. The storage devices 1300a and 1300b may be devices configured to operate in accordance with one or more conventionally-understood protocol(s), such as for example, Universal Flash Storage (UFS), embedded Multi-Media Card (eMMC), and Non-Volatile Memory express (NVMe).

The image capturing device 1410 may capture a still image or a moving image and may include, for example, a camera, a camcorder, and/or a webcam. The user input device 1420 may receive various types of data input from the user of the electronic system 1000 and may include, for example, a touch pad, a keypad, a keyboard, a mouse, and/or a microphone. The sensor 1430 may detect various types of physical quantities that may be obtained from the outside of the electronic system 1000, and convert the detected physical quantities into electrical signals. The sensor 1430 may include, for example, a temperature sensor, a pressure sensor, an illuminance sensor, a position sensor, an acceleration sensor, a biosensor, and/or a gyroscope sensor. The communication device 1440 may transmit/receive signals to/from other devices outside the electronic system 1000 according to various communication protocols. The communication device 1440 may be implemented including, for example, an antenna, a transceiver, and/or a modem.

The display 1450 and the speaker 1460 may function as output devices that respectively provide visual information and aural information to the user of the electronic system 1000. The power supply device 1470 may suitably convert power supplied from a battery (not illustrated) built in the electronic system 1000 and/or an external power supply device and supply the power to each of the components of the electronic system 1000. The connection interface 1480 may provide a connection between the electronic system 1000 and an external device that may be connected to the electronic system 1000 to exchange data with the electronic system 1000. The connection interface 1480 may be configured to operate in accordance with one or more conventionally-understood interface methods, such as for example, Advanced Technology Attachment (ATA), Serial ATA (SATA), external SATA (e-SATA), Small Computer System Interface (SCSI), Serial Attached SCSI (SAS), Peripheral Component Interconnection (PCI), PCI express (PCIe), NVMe, IEEE 1394, Universal Serial Bus (USB), Secure Digital (SD) card, Multi-Media Card (MMC), eMMC, UFS, embedded Universal Flash Storage (eUFS), and/or Compact Flash (CF) card interface.

Figure 13:
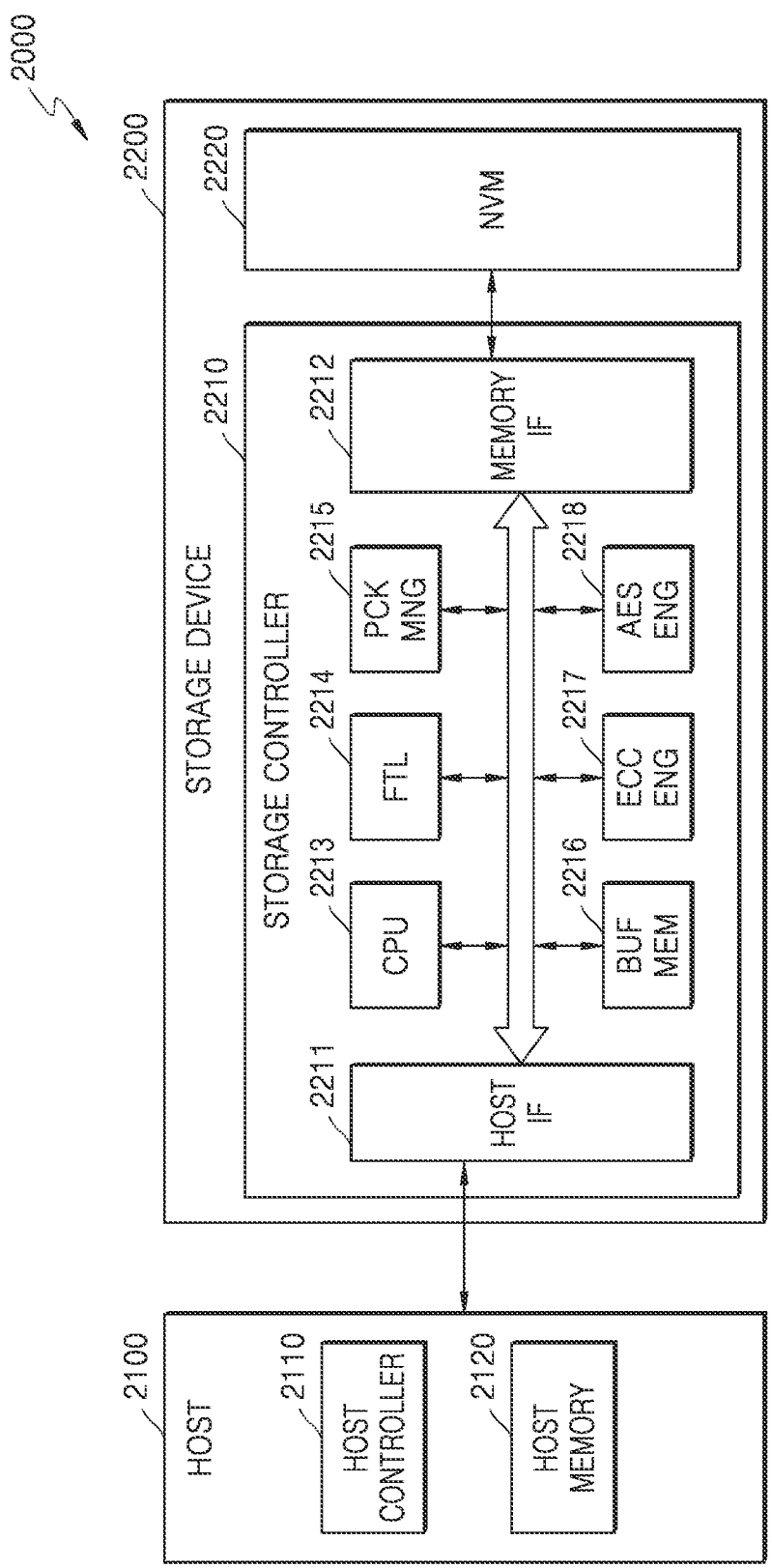
FIG. 13 is a block diagram illustrating in another example a storage system according to embodiments of the inventive concept.

FIG. 13 is a block diagram illustrating in another example a storage system 2000 according to embodiments of the inventive concept.

Referring to FIG. 13, the host-storage system 2000 may generally include a host 2100 and a storage device 2200, wherein the storage device 2200 may include a storage controller 2210 and a non-volatile memory (NVM) 2220. The host 2100 may include a host controller 2110 and a host memory 2120, wherein the host memory 2120 may function as a buffer memory temporarily storing data received by the storage device 2200 and/or data retrieved from the storage device 2200.

The storage device 2200 may include storage mediums for storing data according to the request from the host 2100. As an example, the storage device 2200 may include at least one of a solid state drive (SSD), an embedded memory, and a removable external memory. When the storage device 2200 is an SSD, the storage device 2200 may be a device conforming to the NVMe standard. When the storage device 2200 is an embedded memory or an external memory, the storage device 2200 may be a device conforming to the UFS or eMMC standard. The host 2100 and the storage device 2200 may each generate a packet in accordance with a conventionally-understood protocol and transmit same.

When the non-volatile memory 2220 of the storage device 2200 includes a flash memory, the flash memory may include a 2D NAND memory array or a 3D (or vertical) NAND (VNAND) memory array. As another example, the storage device 2200 may include various other types of non-volatile memories. For example, the storage device 2200 may include MRAMs, spin-transfer torque MRAMs, CBRAMs, FeRAMs, PRAMs, resistive memories (resistive RAMs), and various other types of memories.

In some embodiments, the host controller 2110 and the host memory 2120 may be implemented as separate semiconductor chips. Alternately, the host controller 2110 and the host memory 2120 may be integrated within the same semiconductor chip. As an example, the host controller 2110 may be any one of a plurality of modules provided in an application processor, and the application processor may be implemented as a system-on-chip (SoC). Also, the host memory 2120 may be an embedded memory provided in the application processor or may be a non-volatile memory or a memory module arranged outside an application processor.

The host controller 2110 may manage an operation of storing data (e.g., write data) of a buffer area of the host memory 2120 in the non-volatile memory 2220 or storing data (e.g., read data) of the non-volatile memory 2220 in the buffer area.

The storage controller 2210 may include a host interface 2211, a memory interface 2212, and a central processing unit (CPU) 2213. Also, the storage controller 2210 may further include a flash translation layer (FTL) 2214, a packet manager (PCK MNG) 2215, a buffer memory (BUF MEM) 2216, an error correction code (ECC) engine 2217, and an advanced encryption standard (AES) engine (AES ENG) 2218. The storage controller 2210 may further include a working memory (not illustrated) into which the FTL 2214 is loaded, and the CPU 2213 may execute a flash conversion layer to control a write operation and a read operation on the non-volatile memory 2220.

The host interface 2211 may communicate (e.g., transmit and/or receive) a packet to/from the host 2100. The packet communicated from the host 2100 to the host interface 2211 may include, for example, a command or data to be stored in the non-volatile memory 2220, and the packet communicated from the host interface 2211 to the host 2100 may include, for example, a response to a command or data read from the non-volatile memory 2220. The memory interface 2212 may communicate data to be stored in the non-volatile memory 2220 to the non-volatile memory 2220 or receive data read from the non-volatile memory 2220. The memory interface 2212 may be implemented to comply with a standard protocol such as Toggle or Open NAND Flash Interface (ONFI).

The FTL 2214 may operate (or contribute to) in the performing of various background operations, such as for example, address mapping, memory cell wear-leveling, and garbage collection. Here, address mapping may be used to convert a logical address received from the host 2100 into a corresponding physical address used to actually store data in the non-volatile memory 2220. Wear-leveling may be used to reduce (or prevent) uneven wear (or use degradation) of a particular block among the plurality of blocks in the non-volatile memory 2220, such that no particular group of constituent memory cells becomes excessively worn. In some embodiments, firmware may be used to balance program and/or erase counts across the plurality of blocks. Garbage collection may be used to securing memory capacity in the non-volatile memory 2220 by copying valid data from old block(s) into a new block and then erasing the old block(s).

The packet manager 2215 may generate a packet according to the protocol of an interface negotiated with the host 2100 or parse various information from the packet received from the host 2100. Also, the buffer memory 2216 may temporarily store data to be stored in the non-volatile memory 2220 or data to be read from the non-volatile memory 2220. The buffer memory 2216 may be provided in the storage controller 2210 or may be arranged outside the storage controller 2210.

The ECC engine 2217 may perform an error detection and correction function on read data read from the non-volatile memory 2220. More particularly, the ECC engine 2217 may generate parity bits for write data to be stored in the non-volatile memory 2220, and the generated parity bits may be stored in the non-volatile memory 2220 together with the write data. When reading data from the non-volatile memory 2220, the ECC engine 2217 may correct an error in the read data using the parity bits read from the non-volatile memory 2220 together with the read data and provide the error-corrected read data.

The AES engine 2218 may perform at least one of an encryption operation and a decryption operation on the data input into the storage controller 2210 using a symmetric-key algorithm.

Figure 14:
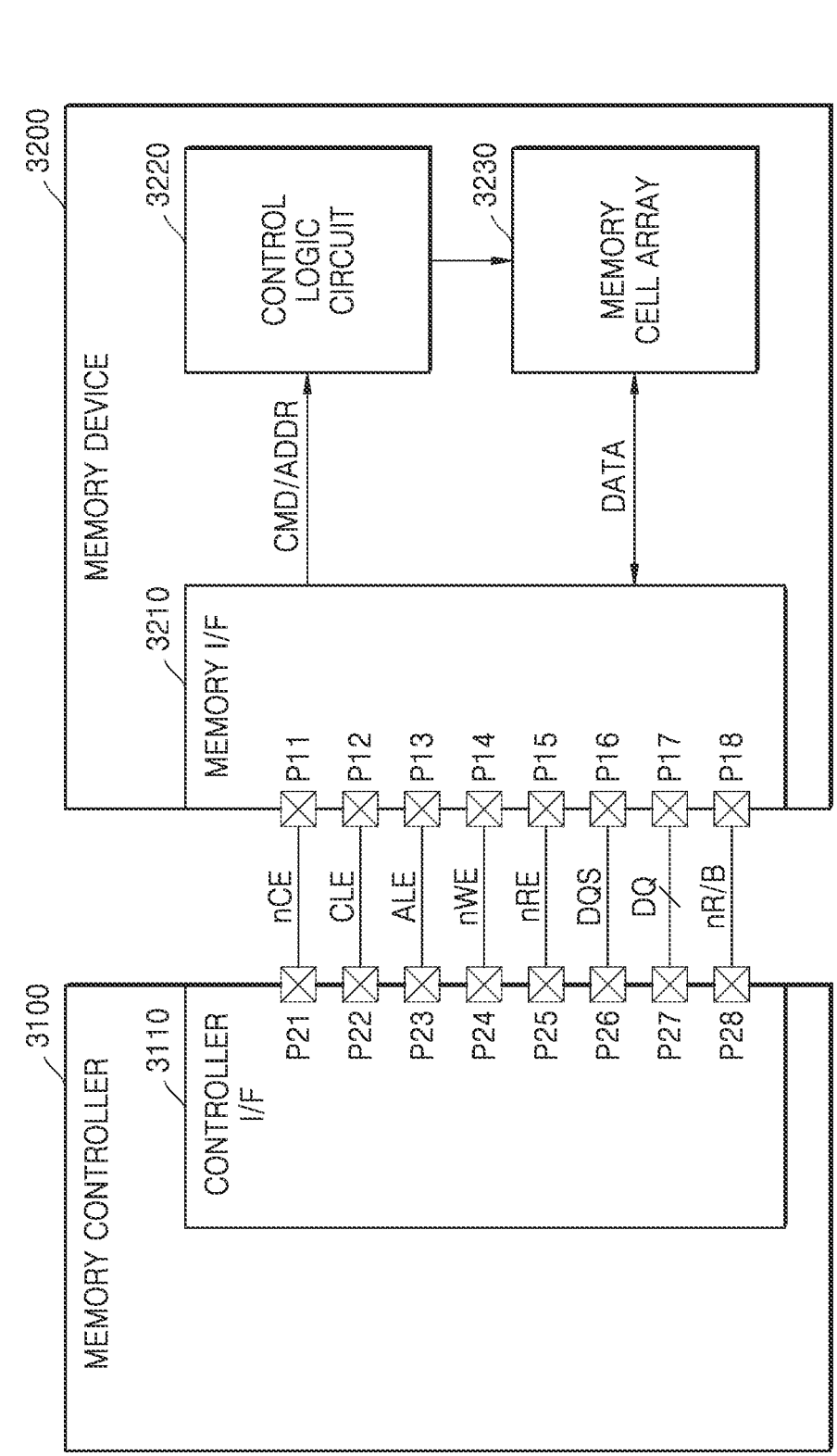
FIG. 14 is a block diagram illustrating in still another example a storage system according to embodiments of the inventive concept.

FIG. 14 is a block diagram illustrating in still another example a memory system 3000 according to embodiments of the inventive concept.

Referring to FIG. 14, the memory system 3000 may generally include a memory device 3200 and a memory controller 3100, wherein the memory device 3200 may correspond to one of non-volatile memory devices configured to communicate with the memory controller 3100 via at least one of a plurality of channels.

The memory device 3200 may include first to eighth pins P11 to P18, a memory interface circuit 3210, a control logic circuit 3220, and a memory cell array 3230. The memory interface circuit 3210 may receive a chip enable signal nCE from the memory controller 3100 through the first pin P11. The memory interface circuit 3210 may transmit/receive signals to/from the memory controller 3100 through the second to eighth pins P12 to P18 according to the chip enable signal nCE. For example, when the chip enable signal nCE is in an enable state (e.g., at a low level), the memory interface circuit 3310 may transmit/receive signals to/from the memory controller 3100 through the second to eighth pins P12 to P18.

The memory interface circuit 3210 may receive a command latch enable signal CLE, an address latch enable signal ALE, and a write enable signal nWE from the memory controller 3100 through the second to fourth pins P12 to P14. Through the seventh pin P17, the memory interface circuit 3210 may receive a data signal DQ from the memory controller 3100 or communicate a data signal DQ to the memory controller 3100. A command CMD, an address ADDR, and data DATA may be communicated through the data signal DQ. For example, the data signal DQ may be communicated through a plurality of data signal lines. In this case, the seventh pin P17 may include a plurality of pins corresponding to a plurality of data signals.

The memory interface circuit 3210 may obtain the command CMD from the data signal DQ received in an enable period (e.g., a high-level state) of the command latch enable signal CLE based on the toggle timings of the write enable signal nWE. The memory interface circuit 3210 may obtain the address ADDR from the data signal DQ received in an enable period (e.g., a high-level state) of the address latch enable signal ALE based on the toggle timings of the write enable signal nWE.

In some embodiments, the write enable signal nWE may toggle between a high level and a low level while maintaining a static state (e.g., a high level or a low level). For example, the write enable signal nWE may toggle in a period during which the command CMD or the address ADDR is communicated. Accordingly, the memory interface circuit 3210 may obtain the command CMD or the address ADDR based on the toggle timings of the write enable signal nWE.

The memory interface circuit 3210 may receive a read enable signal nRE from the memory controller 3100 through the fifth pin P15. Through the sixth pin P16, the memory interface circuit 3210 may receive a data strobe signal DQS from the memory controller 3100 or communicate a data strobe signal DQS to the memory controller 3100.

During a data output operation of the memory device 3200, the memory interface circuit 3210 may receive a toggling read enable signal nRE through the fifth pin P15 before providing (or outputting) the data. The memory interface circuit 3210 may generate a toggling data strobe signal DQS based on the toggling of the read enable signal nRE. For example, the memory interface circuit 3210 may generate a data strobe signal DQS that starts toggling after a predetermined delay (e.g., tDQSRE) with respect to a toggling start time of the read enable signal nRE. The memory interface circuit 310 may communicate the data signal DQ including the data DATA based on the toggle timing of the data strobe signal DQS. Accordingly, the data DATA may be communicated to the memory controller 3100 in alignment with the toggle timing of the data strobe signal DQS.

In a data (DATA) input operation of the memory device 3200, when the data signal DQ including the data DATA is received from the memory controller 3100, the memory interface circuit 3210 may receive a toggling data strobe signal DQS from the memory controller 3100 together with the data DATA. The memory interface circuit 3210 may obtain the data DATA from the data signal DQ based on the toggle timing of the data strobe signal DQS. For example, the memory interface circuit 3210 may obtain the data DATA by sampling the data signal DQ at rising edges and falling edges of the data strobe signal DQS.

The memory interface circuit 3210 may communicate a ready/busy output signal nR/B to the memory controller 3100 through the eighth pin P18. The memory interface circuit 3210 may communicate state information of the memory device 3200 to the memory controller 3100 through the ready/busy output signal nR/B. When the memory device 3200 is in a busy state (i.e., when internal operations of the memory device 3200 are being performed), the memory interface circuit 3210 may communicate the ready/busy output signal nR/B representing the busy state to the memory controller 3100. When the memory device 3200 is in a ready state (i.e., when internal operations of the memory device 3200 are not performed or are completed), the memory interface circuit 3210 may communicate the ready/busy output signal nR/B representing the ready state to the memory controller 3100. For example, while the memory device 3200 reads the data DATA from the memory cell array 3230 in response to a page read command, the memory interface circuit 3210 may communicate the ready/busy output signal nR/B representing the busy state (e.g., a low level) to the memory controller 3100. For example, while the memory device 3200 reads the data DATA from the memory cell array 3230 in response to a program command, the memory interface circuit 3210 may communicate the ready/busy output signal nR/B representing the busy state to the memory controller 3100.

The control logic circuit 3220 may generally control various operations of the memory device 3200. The control logic circuit 3220 may receive the command/address CMD/ADDR obtained from the memory interface circuit 3210. The control logic circuit 3220 may generate control signals for controlling other components of the memory device 3200 according to the received command/address CMD/ADDR. For example, the control logic circuit 3220 may generate various control signals for programming data DATA in the memory cell array 3230 or reading data DATA from the memory cell array 3230.

The memory cell array 3230 may store the data DATA obtained from the memory interface circuit 3210 under the control by the control logic circuit 3220. The memory cell array 3230 may output the stored data DATA to the memory interface circuit 3210 under the control by the control logic circuit 3220.

The memory cell array 3230 may include a plurality of memory cells. For example, the plurality of memory cells may be flash memory cells. However, the inventive concept is not limited thereto, and the memory cells may include RRAM cells, FRAM cells, PRAM cells, thyristor random access memory (TRAM) cells, and/or MRAM cells. Hereinafter, embodiments of the inventive concept will be described focusing on an embodiment in which the memory cells include NAND flash memory cells.

The memory controller 3100 may include first to eighth pins P21 to P28 and a controller interface circuit 3110. The first to eighth pins P21 to P28 may correspond to the first to eighth pins P11 to P18 of the memory device 3200. The controller interface circuit 3110 may communicate the chip enable signal nCE to the memory device 3200 through the first pin P21. Through the second to eighth pins P22 to P28, the controller interface circuit 3110 may transmit/receive signals to/from the memory device 3200 selected through the chip enable signal nCE.

The controller interface circuit 3110 may communicate the command latch enable signal CLE, the address latch enable signal ALE, and the write enable signal nWE to the memory device 3200 through the second to fourth pins P22 to P24. Through the seventh pin P27, the controller interface circuit 3110 may communicate the data signal DQ to the memory device 3200 or receive the data signal DQ from the memory device 3200.

The controller interface circuit 3110 may communicate the data signal DQ including the command CMD or the address ADDR to the memory device 3200 together with a toggling write enable signal nWE. The controller interface circuit 3110 may communicate the data signal DQ including the command CMD to the memory device 3200 according to the transmission of the command latch enable signal CLE having an enable state and may communicate the data signal DQ including the address ADDR to the memory device 3200 according to the transmission of the address latch enable signal ALE having an enable state.

The controller interface circuit 3110 may communicate the read enable signal nRE to the memory device 3200 through the fifth pin P25. Through the sixth pin P26, the controller interface circuit 3110 may receive the data strobe signal DQS from the memory device 3200 or communicate the data strobe signal DQS to the memory device 3200.

In a data (DATA) output operation of the memory device 3200, the controller interface circuit 3110 may generate a toggling read enable signal nRE and communicate the read enable signal nRE to the memory device 3200. For example, the controller interface circuit 3110 may generate a read enable signal nRE changed from a fixed state (e.g., a high level or a low level) into a toggle state before the data DATA is output. Accordingly, a toggling data strobe signal DQS may be generated in the memory device 3200 based on the read enable signal nRE. The controller interface circuit 3110 may receive the data signal DQ including the data DATA from the memory device 3200 together with the toggling data strobe signal DQS. The controller interface circuit 3110 may obtain the data DATA from the data signal DQ based on the toggle timing of the data strobe signal DQS.

In a data (DATA) input operation of the memory device 3200, the controller interface circuit 3110 may generate a toggling data strobe signal DQS. For example, the controller interface circuit 3110 may generate a data strobe signal DQS changed from a fixed state (e.g., a high level or a low level) into a toggle state before the data DATA is communicated. The controller interface circuit 3110 may communicate the data signal DQ including the data DATA to the memory device 3200 based on the toggle timings of the data strobe signal DQS. The controller interface circuit 3110 may receive the ready/busy output signal nR/B from the memory device 3200 through the eighth pin P28. The controller interface circuit 3110 may determine the state information of the memory device 3200 based on the ready/busy output signal nR/B.

Figure 15:
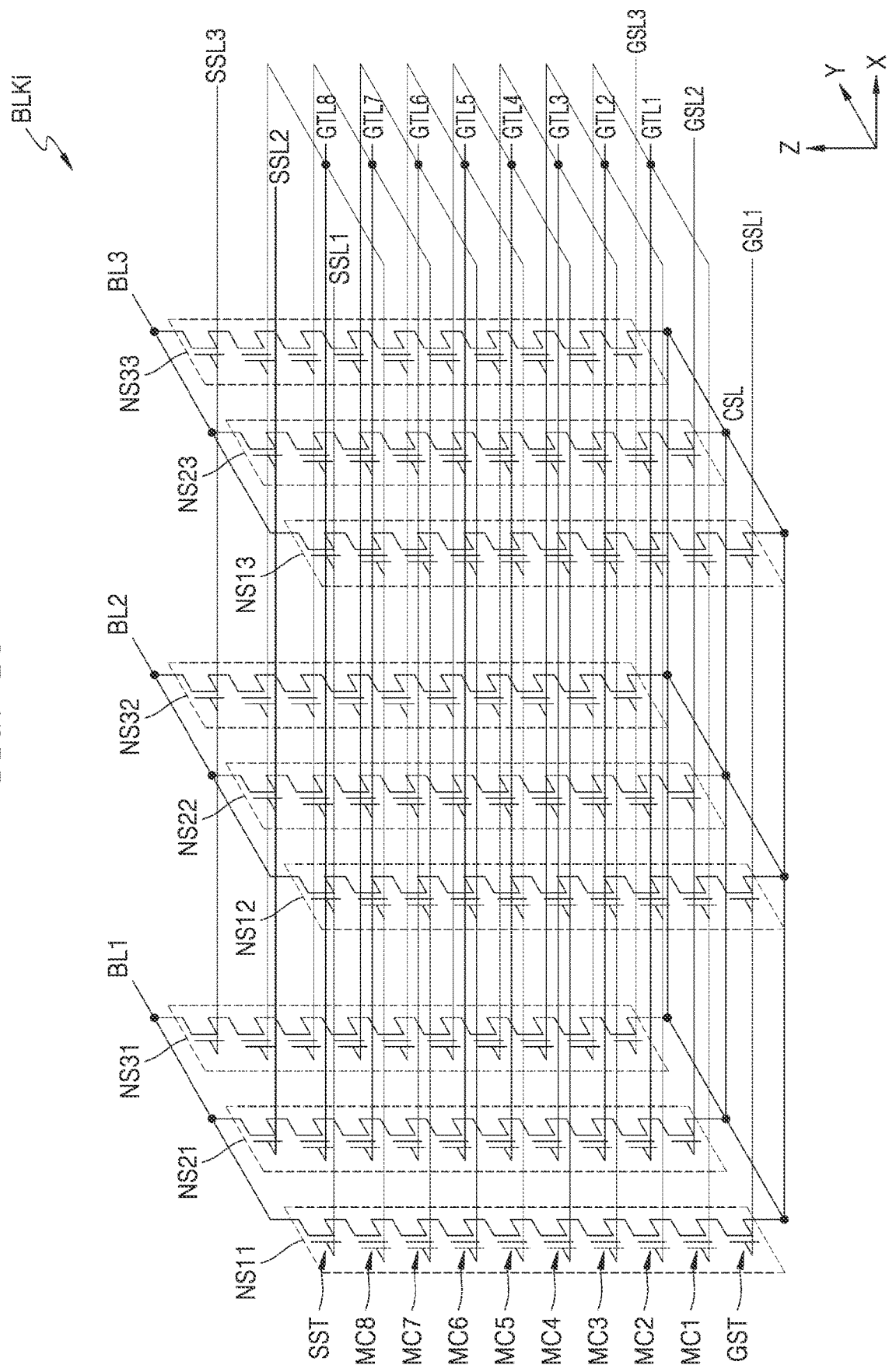
FIG. 15 is a perspective diagram illustrating in part a memory block BLKi that may be included within a 3D VNAND structure according to embodiments of the inventive concept.

FIG. 15 is a perspective view illustrating in part a memory block BLKi of a 3D VNAND structure according to embodiments of the inventive concept.

Referring to FIG. 15, the memory block BLKi is a 3D memory block that may be formed as part of a 3D structure on a substrate. For example, a plurality of memory NAND strings included in the memory block BLKi may be formed in a direction perpendicular to the substrate (for example, in a z direction perpendicular to an xy plane).

The memory block BLKi may include a plurality of memory NAND strings NS11 to NS33 connected between bit lines BL1, BL2, and BL3 and a common source line CSL. Each of the plurality of memory NAND strings NS11 to NS33 may include a string selection transistor SST, a plurality of memory cells MC1, MC2, . . . , MC8, and a ground selection transistor GST. Although FIG. 15 illustrates that each of the plurality of memory NAND strings NS11 to NS33 includes eight memory cells MC1, MC2, . . . , MC8, the inventive concept is not necessarily limited thereto.

The string selection transistor SST may be connected to corresponding string selection lines SSL1, SSL2, and SSL3. The plurality of memory cells MC1, MC2, . . . , MC8 may be respectively connected to corresponding gate lines GTL1, GTL2, . . . , GTL8. The gate lines GTL1, GTL2, . . . , GTL8 may correspond to word lines, and some of the gate lines GTL1, GTL2, . . . , GTL8 may correspond to dummy word lines. The ground selection transistor GST may be connected to corresponding ground selection lines GSL1, GSL2, and GSL3. The string selection transistor SST may be connected to the corresponding bit lines BL1, BL2, and BL3, and the ground selection transistor GST may be connected to the common source line CSL.

Gate lines (e.g., GTL1) of the same height may be connected in common, and the ground selection lines GSL1, GSL2, and GSL3 and the string selection lines SSL1, SSL2, and SSL3 may be separated from each other. Although FIG. 15 illustrates that the memory block BLKi is connected to eight gate lines GTL1, GTL2, . . . , GTL8 and three bit lines BL1, BL2, and BL3, the inventive concept is not necessarily limited thereto.

As described above, by selecting a memory block to store data according to the pattern data, the wear-out degree between the memory blocks may be uniformly distributed and the life of the memory block may be increased.

While the inventive concept has been particularly shown and described with reference to embodiments thereof, it will be understood that various changes in form and details may be made therein without departing from the scope of the inventive concept, as defined by the following claims.

What is claimed is:

1. A storage device comprising:
   a non-volatile memory including a plurality of memory blocks; and
   a memory controller configured to
     receive a write request including a logical address from a host,
     receive data associated with the write request,
     select a selection memory block from among the plurality of memory blocks based on pattern data corresponding to the logical address, and
     provide the data, a write command associated with the write request, and a physical address corresponding to the selection memory block to the non-volatile memory,
     wherein the pattern data includes first counting information characterizing a first count and second counting information characterizing a second count,
     wherein the first count represents how many times a characteristic parameter value falls within a first range,
     wherein the second count represents how many times the characteristic parameter value falls within a second range different from the first range, and
     wherein the characteristic parameter value is associated with the logical address.

2. The storage device of claim 1, wherein the memory controller is further configured to update the pattern data by determining whether the characteristic parameter value falls within one of the first range and the second range whenever the logical address is accessed.

3. The storage device of claim 2, wherein the memory controller is further configured to increase the first count when the characteristic parameter value falls within the first range, and increase the second count when the characteristic parameter value falls within the second range.

4. The storage device of claim 1, wherein the characteristic parameter value is a corresponding access time between an initial time and an access time associated with accessing the logical address.

5. The storage device of claim 4, wherein the memory controller comprises:
a buffer memory configured to temporarily store the pattern data;
a counter configured to count time starting from the initial time;
a pattern generation circuit configured to obtain, as the access time, a time counted by the counter from the initial time to the access time, update the pattern data in response to the access time, and reinitialize the counter to the initial time; and
a scheduler configured to provide the physical address, the data, and the write command.

6. The storage device of claim 1, wherein the plurality of memory blocks comprise user memory blocks storing user data and meta memory blocks storing meta data,
the meta data comprises erase count information representing an erase count of a memory block, and
the memory controller is configured to open any one of the user memory blocks, based on the pattern data and the erase count information, when the selection memory block is closed, and select the opened user memory block as the selection memory block by mapping a physical address of the opened user memory block to the logical address.

7. The storage device of claim 6, wherein the memory controller is configured to open a user memory block having a first erase count with respect to first pattern data or open a user memory block having a second erase count with respect to second pattern data.

8. The storage device of claim 1, wherein upon determining that a number of free memory blocks is less than a reference number, the memory controller is configured to
select one memory block from among the plurality of memory blocks as a source memory block, wherein the one memory block stores least valid data,
select another memory block from among the plurality of memory blocks as a target memory block in response to the pattern data associated with the valid data, and
control the non-volatile memory to copy the valid data from the source memory block to the target memory block.

9. An operating method of a storage device, the operating method comprising:
receiving a logical address and data from a host;
determining pattern data corresponding to the logical address;
selecting a selection memory block from among a plurality of memory blocks based on the pattern data; and
storing the data in the selection memory block,
wherein the pattern data includes first counting information characterizing a first count and second counting information characterizing a second count,
wherein the first count represents how many times a characteristic parameter value falls within a first range,
wherein the second count represents how many times the characteristic parameter value falls within a second range different from the first range, and
wherein the characteristic parameter value is associated with the logical address.

10. The operating method of claim 9, wherein the determining of the pattern data comprises:
obtaining a characteristic parameter value in response to the logical address;
updating the pattern data in response to the characteristic parameter value whenever the logical address is accessed; and
storing the updated pattern data in a buffer memory.

11. The operating method of claim 10, wherein the characteristic parameter value is a corresponding access time from an initial time to an access time at which the logical address is accessed, and the updating of the pattern data comprises:
counting time from the initial time;
obtaining a counted time from the initial time to the access time as the access time;
determining whether the access time falls within the first range or the second range;
increasing the first count or the second count in relation to the determining of whether the access time falls within the first range or the second range; and
reinitializing the counted time to the initial time.

12. The operating method of claim 10, wherein the characteristic parameter value is a size of the data, and the updating of the pattern data comprises:
determining whether the size of the data falls within the first range or the second range; and
increasing the first count or the second count based on whether the size of the data falls within the first range or the second range.

13. The operating method of claim 9, wherein
the plurality of memory blocks include user memory blocks configured to store user data received from the host and meta memory blocks configured to store meta data associated with the user data and including erase count information indicating an erase count for at least one of the plurality of memory blocks,
the selection memory block is a closed memory block, and
the selecting of the selection memory block from among the plurality of memory blocks based on the pattern data comprises:
opening one of the user memory blocks in response to the pattern data and the erase count information; and
mapping a physical address corresponding to the one of the user memory blocks to the logical address.

14. The operating method of claim 13, wherein the opening of the one of the user memory blocks in response to the pattern data and the erase count information comprises:
opening a user memory block having a first erase count with respect to first pattern data or opening a user memory block having a second erase count with respect to second pattern data.

15. The operating method of claim 9, further comprising performing garbage collection, upon determining that a number of free memory blocks among the plurality of memory blocks has fallen below a reference number, by:
selecting one memory block from among the plurality of memory blocks storing least valid data as a source memory block, selecting another memory block from among the plurality of memory blocks in response to pattern data corresponding to the valid data as a target memory block, and copying the valid data from the source memory block to the target memory block.

16. A memory controller comprising:

a buffer memory configure to store pattern data corresponding to a logical address;

at least one counter configured to count time from an initial time; and a flash translation layer configured to obtain an access time by controlling the at least one counter to count time from the initial time to a time at which the logical address is accessed, update the pattern data based on the access time, and initialize the at least one counter to the initial time, wherein the pattern data includes first counting information characterizing a first count and second counting information characterizing a second count, wherein the first count represents how many times a characteristic parameter value falls within a first range, wherein the second count represents how many times the characteristic parameter value falls within a second range different from the first range, and wherein the characteristic parameter value is associated with the logical address.

17. The memory controller of claim 16, wherein the flash translation layer is further configured to determine whether the access time falls within one of the first range and the second range, update the pattern data by increasing the first count upon determining that the access time falls within the first range, and update the pattern data by increasing the second count upon determining that the access time falls within the second range.

18. The memory controller of claim 17, wherein the first counting information comprises a first bit value corresponding to a first count range or a second bit value corresponding to a second count range, a maximum value of the first count range is less than a minimum value of the second count range, and the flash translation layer is further configured to update the pattern data such that the first counting information comprises the first bit value, when increased first count is within the first count range, and update the pattern data such that the first counting information comprises the second bit value, when the increased first count is within the second count range.

19. The memory controller of claim 17, wherein the second counting information comprises a first bit value corresponding to a first count range or a second bit value corresponding to a second count range, a maximum value of the first count range is less than a minimum value of the second count range, and the flash translation layer is further configured to update the pattern data such that the second counting information comprises the first bit value, when the increased second count is within the first count range, and update the pattern data such that the second counting information comprises the second bit value, when the increased second count is within the second count range.

20. The memory controller of claim 16, wherein the at least one counter includes a first counter configured to count time upon determining that a first logical address is accessed, and a second counter configured to count time upon determining that a second logical address is accessed.

* * * * *